US011946231B2

(12) United States Patent
Merkt

(10) Patent No.: US 11,946,231 B2
(45) Date of Patent: Apr. 2, 2024

(54) METHOD OF CONTROLLING TURF GRADING EQUIPMENT

(71) Applicant: G2 Turftools, Inc., Athens, AL (US)

(72) Inventor: Eric L. Merkt, Athens, AL (US)

(73) Assignee: G2 Turftools, Inc., Athens, AL (US)

( * ) Notice: Subject to any disclaimer, the term of this patent is extended or adjusted under 35 U.S.C. 154(b) by 556 days.

(21) Appl. No.: 17/328,163

(22) Filed: May 24, 2021

(65) Prior Publication Data

US 2021/0381204 A1 Dec. 9, 2021

Related U.S. Application Data

(60) Provisional application No. 63/034,167, filed on Jun. 3, 2020.

(51) Int. Cl.
*E02F 9/26* (2006.01)
(52) U.S. Cl.
CPC .................. *E02F 9/265* (2013.01)
(58) Field of Classification Search
CPC ...................................... E02F 9/265
See application file for complete search history.

(56) References Cited

U.S. PATENT DOCUMENTS

| 3,225,852 | A | 12/1965 | Simmons et al. |
| 3,334,912 | A | 8/1967 | Mauck |
| 7,992,649 | B2 | 8/2011 | Merkt |
| 8,555,992 | B1 | 10/2013 | Merkt |
| 9,198,339 | B2 | 12/2015 | Merkt |
| 10,676,894 | B2 * | 6/2020 | Sharp ..................... E02F 3/7609 |
| 11,098,461 | B2 * | 8/2021 | Merkt ..................... A01D 34/52 |
| 11,486,113 | B2 * | 11/2022 | Gentle .................... E02F 3/841 |
| 2018/0271017 | A1 | 9/2018 | Merkt |
| 2019/0194907 | A1 * | 6/2019 | Sharp ..................... E02F 3/962 |
| 2019/0257058 | A1 * | 8/2019 | Merkt ..................... G01S 19/14 |
| 2020/0173135 | A1 * | 6/2020 | Gentle .................... E02F 3/7627 |

FOREIGN PATENT DOCUMENTS

| EP | 1634488 | 1/2007 |
| WO | WO 2014/064143 A1 | 5/2014 |

* cited by examiner

*Primary Examiner* — Khoi H Tran
*Assistant Examiner* — Aaron G Cain
(74) *Attorney, Agent, or Firm* — Kirk A. Wilson; Joseph T. Guy; Patent Filing Specialist Inc.

(57) ABSTRACT

An improved system and method for controlling turf grading equipment is described. The system comprises a turf grading device wherein the turf grading device is moved longitudinally over an area and the turf grading device comprises a left side and a right side with each side being able to independently move vertically and in concert provide a motion of pitch and yaw. The system includes a control system wherein the control system controls movement of the left side and the right side independently. The control system comprises a controller interface capable of selecting between a manual override mode and a module selection mode wherein the module selection mode selected from a grade adjust laser mode, a grade adjust autograde mode, a grade adjust autodepth mode and a grade adjust slope mode.

18 Claims, 20 Drawing Sheets

METHOD OF CONTROLLING TURF GRADING EQUIPMENT

CROSS-REFERENCE TO RELATED APPLICATIONS

This application claims priority to pending U.S. Provisional Application No. 63/034,167 filed Jun. 3, 2020, incorporated herein by reference in its entirety.

FIELD OF THE DISCLOSURE

The disclosure relates generally to a method of controlling turf grading equipment such as those apparati and systems typically used on tractors, skid-steer, and other vehicles. The present invention has the ability to independently vary the inclination of each side of an apparatus, such as a turf box, about a centerline axis running substantially parallel to the longitudinal direction of travel during use, as well as adjusting the vertical elevation of the attachment and allowing for additional adjustments to the pitch and/or yaw of the attachment.

BACKGROUND OF THE DISCLOSURE

The present invention relates to a method of controlling levelers and turf grading equipment or turf grading device, which are typically attached to tractors, excavators, and skid-steer vehicles for the purpose of levelling, smoothing or contouring the ground. It is envisaged however that the present invention may find other uses, and be adapted therefore.

Apparati for levelling, smoothing and contouring ground take many shapes and designs, including those which are merely dragged along the ground. Many, however, have blades, sometimes known as mould boards, box blades, or turf boxes, for levelling and altering the contour of the ground. Some devices, such as turf planers, have cutting elements which allow soil to be removed, such as by trucks, as detailed in U.S. Pat. Nos. 9,198,339; 8,555,992 and 7,992,649 and U.S. Publ. Appl. Nos. 20180271017 and 20190257058 which are all incorporated herein by reference. In these versions, the height of the blade is typically able to be altered, which allows the user control over grading, levelling and/or sculpting the contour of the ground. Elevation adjustment is sometimes achieved by raising the entire levelling assembly, while others may rely on merely raising and lowering a portion with the blade.

For agricultural applications, generally the contour of the land needs merely to be smoothed. However, levelers have found use in construction sites and sports fields where they are commonly used to level large areas for foundations, infields, and similar surfaces. Here the levelling needs to be precisely, and truly horizontal. Alternatively, the desire may be to contour a large area to allow for drainage such as on an athletic field. Achieving this requires operator skill, and patience. Wheeled versions tend to be most popular as merely raising and lowering the blade, as opposed to the entire levelling assembly, is quicker and more precise, enabling quick responses. When coupled with a laser levelling system, adjusting only the blade elevation allows the operator to work much more quickly.

In many instances, not only must the blade elevation be altered but so too must its inclination, referred to herein as pitch, relative to the tractor/skid steer to ensure that it is always at true horizontal. If the tractor unit traverses a slope, a fixed inclination blade will level the ground at the same inclination as the tractor unit is. This makes levelling mounds and slopes to the true horizontal extremely difficult.

To address this, the prior art uses leveler attachment arrangements (typically referred to as Quick-Hitch) which include an arrangement for varying the inclination of the attachment. These rotational arrangements are expensive, and also add considerable weight to the load carried by the towing unit. They are also limited in the degree of precision with respect to inclination (pitch) to a particular angle, and relatively slow to adjust. This slows any levelling operation.

Accordingly, the inventor has identified a need for a levelling unit, which can address the above issues, and at least provide a blade portion able to be adjusted in elevation, and inclination (pitch), and which can be towed.

In some situations, ground preparation work needs to be performed before levelling and grading can occur. In practice this involves working the ground/site with a different implement. For example, where a site is covered with grass or weed, something such as what is commonly known as a "Harley Rake" may be used, which is essentially a powered rotating drum rake. The radially protruding tines on the powered rotating rake penetrate through the upper layer of the ground, to effectively break up thatch, matted plant material, compacted soil, and even light surface coverings such as bitumen. Without this prior treatment the blade tends to skid across the surface of the ground.

In more difficult situations a fixed rake with downward ground penetrating tines may be used to break up harder ground, or where foreign objects which may damage a Harley rake may be present. This solution is more likely to be used on old construction and demolition sites, or where harder man-made coverings of asphalt and bitumen may be present. Again, preparing the ground prior to subsequent operation with a blade assembly allows more effective levelling to be performed.

Prior art devices require that the ground must be worked more than once—first with a ground preparing tool, and then the levelling/contouring operation. If the operator has two machines, then one can be preparing the ground while the leveler follows. The disadvantages of these techniques is the extra cost for more tools, the extra time of multiple operations, and the extra cost if more than one tractor is used. These represent significant disadvantages in terms of time and capital expense. It would therefore be a significant advantage to the ground-working and construction industries if these disadvantages could at least be partially addressed.

Also, more and more operators are using laser guidance systems for controlling their attached implements. The additional speed and accuracy of laser assisted guidance is making it almost a necessity for operators to remain competitive and meet accelerated timeframe expectations required on many jobs. The downside is that such systems are an expensive investment, and usually they are only implemented on a blade implement, and not on other accessories as well. However, there is still an advantage if accessories performing ground preparation work are also able to be controlled by laser guided assistance systems. Apart from reducing the work required by a subsequent blade operation, there are some instances where significant advantage may be obtained.

One such instance is in roadway repair and construction, and by roadway we include paths, sidewalks, carparks, and similar sealed areas. Quite often minimal and subtle grading is required (more for water runoff requirements), and being able to use a laser assisted power rake to prepare sublayers for final application of concrete or asphalt can be advantageous. It would therefore be of advantage to the road-working, ground-working, and construction industries at least, if the additional cost of adding laser guided control systems to individual ground-working accessories could be addressed.

It is also useful for some applications to not only be able to modify the roll characteristics of a blade or accessory, but sometimes also the pitch and/or yaw (see FIG. 1). This can be dictated by a number of factors, including the terrain and materials being worked, but is sometimes useful. It would therefore be useful if a leveler could be controlled to provide for adjustments in either or both pitch and roll as well according to user and operator choice.

BRIEF DESCRIPTION OF THE DISCLOSURE

This disclosure relates to a method for controlling turf grading equipment or a turf grading device such as those apparatus and system typically used on tractors, skid-steer, and other vehicles. More specifically, the present invention is related to a method of controlling turf grading equipment or a turf grading device, such as a turf box or a turf planer, and particularly those comprising a wheel assembly in which the transport pivot axle is pivotally mounted and controlled for compensating for all types of variations and unevenness in a ground surface.

These and other features, aspects and advantages of the present disclosure will become better understood with reference to the following description and appended claims. The accompanying drawings, which are incorporated in and constitute a non-limiting part of this specification, illustrate embodiments of the disclosure and, together with the description, serve to explain the principles of the disclosure.

These and other embodiments, as will be realized, are provided in a system for controlling turf grading equipment. The system comprises a turf grading device wherein the turf grading device is moved longitudinally over an area and the turf grading device comprises a left side and a right side with each side being able to independently move vertically and in concert provide a motion of pitch and yaw. The system includes a control system wherein the control system controls movement of the left side and the right side independently. The control system comprises a controller interface capable of selecting between a manual override mode and a module selection mode wherein the module selection mode selects from a grade adjust laser mode, a grade adjust autograde mode, a grade adjust autodepth mode and a grade adjust slope mode. The controller interface can include a joystick, or control column, as an input device consisting of a stick that pivots on a base and reports its angle or direction to the controller. The grade adjust laser mode comprises a laser transmitter in a fixed location relative to the area. The laser transmitter transmits a laser beam over the area and at least one laser sensor on the turf grading device wherein the laser sensor moves in concert with the left side or right side. A grade adjust laser mode controller determines a location of the laser sensor relative to the laser beam and relays a laser instruction to a laser control logic module wherein the laser control module actuates a transport cylinder to move the right side or the left side vertically. The grade adjust autograde mode comprises at least one radar proximity sensor wherein the radar proximity sensor moves in concert with the left side or right side and detects a height above the area. An autograde controller receives the height and relays a height signal to a proximity control logic module wherein the proximity control logic module actuates the transport cylinder to move the right side or left side vertically. The grade adjust autodepth mode comprises at least one transport cylinder sensor wherein the transport cylinder sensor determines the extent of extension of the transport cylinder and relays the extension to a transport cylinder controller wherein the transport cylinder controller relays the extension to a cylinder control logic module which actuates the transport cylinder to move the left side or right side vertically. The grade adjust slope mode comprises a slope sensor which determines an angle of the turf grading device relative to a lateral direction and relays the angle to a slope controller wherein the slope controller relays the slope to a slope control logic module wherein the slop control logic module actuates the transport cylinder to move the right side or the left side vertically to adjust the yaw of the turf grading device.

Yet another embodiment is provided in a method for controlling turf grading equipment. The method comprises: providing a turf grading device and moving the turf grading device longitudinally over an area wherein the turf grading device comprises a left side and a right side with each side being able to independently move vertically and the left side and right side move in concert to provide a motion of pitch and yaw; moving the left side and right side independently by a control system comprising: selecting between a manual override mode and a module selection mode wherein the module selection mode comprises selecting, by a controller interface, a grade adjust laser mode, a grade adjust autograde mode, a grade adjust autodepth mode and a grade adjust slope mode; transmitting a laser beam over the area by a laser transmitter when the grade adjust laser mode is selected wherein the laser transmitter is in a fixed location relative to the area; detecting the laser beam by at least one laser sensor on the turf grading device wherein the laser sensor moves in concert with the left side or right side of the turf grading device; determining a location of the laser sensor relative to the laser beam by a grade adjust laser mode controller and actuating a transport cylinder to move the right side or the left side vertically by a laser control logic module; determining a height above the area by at least one radar proximity sensor, when in the grade adjust autograde mode, wherein the radar proximity sensor moves in concert with the left side or right side of the turf grading device; receiving the height by an autograde controller and relaying a height signal to a proximity control logic module wherein the proximity control logic module actuates the transport cylinder to move the right side or left side vertically; determining the extent of extension of the transport cylinder by at least one transport cylinder sensor, when in the grade adjust autodepth mode, wherein the transport cylinder sensor relays the extension to a transport cylinder controller wherein the transport cylinder controller relays the extension to a cylinder control logic module which actuates the transport cylinder to move the right side or left side vertically; and determining a slope by a slope sensor, when in the grade adjust slope mode, wherein the slope sensor determines an angle of the turf grading device relative to a lateral direction and relays the angle to a slope controller wherein the slope controller relays the slope to a slope control logic module wherein the slop control logic module actuates the transport cylinder to move the right side or left side vertically to adjust the yaw of the turf grading device.

Yet another embodiment is provided in a non-transitional computer readable storage medium comprising controlling a turf grading device wherein the turf grading device is moved longitudinally over an area and the turf grading device comprises a left side and a right side with each side being able to independently move vertically and the left side and right side move in concert to provide a motion of pitch and yaw. The non-transitional computer readable storage medium comprises a control system module for the turf grading device wherein the control system controls movement of the left side and right side independently. The control system comprises a controller interface module capable of selecting between a manual override mode and a module selection mode wherein the module selection mode selects from a grade adjust laser mode, a grade adjust autograde mode, a grade adjust autodepth mode and a grade adjust slope mode. The grade adjust laser mode comprises a laser transmitter in a fixed location relative to the area wherein the laser transmitter transmits a laser beam over the area. At least one laser sensor is on the turf grading device wherein the laser sensor moves in concert with the left side or right side. A grade adjust laser mode controller determines a location of the laser sensor relative to the laser beam and relays a laser instruction to a laser control logic module. The laser control module actuates a transport cylinder to move the right side or the left side vertically. The grade adjust autograde mode comprises at least one radar proximity sensor wherein the radar proximity sensor moves in concert with the left side or right side and detects a height above the area. An autograde controller receives the height and relays a height signal to a proximity control logic module wherein the proximity control logic module actuates the transport cylinder to move the right side or the left side vertically. The grade adjust autodepth mode comprises at least one transport cylinder sensor wherein the transport cylinder sensor determines the extent of extension of the transport cylinder and relays the extension to a transport cylinder controller wherein the transport cylinder controller relays the extension to a cylinder control logic module which actuates the transport cylinder to move the right side or left side vertically. The grade adjust slope mode comprises a slope sensor which determines an angle of the turf grading device relative to a lateral direction and relays the angle to a slope controller wherein the slope controller relays the slope to a slope control logic module. The slop control logic module actuates the transport cylinder to move the right side or left side vertically to adjust the yaw of the turf grading device.

BRIEF DESCRIPTION OF THE DRAWINGS

A full and enabling disclosure, including the best mode thereof, directed to one of ordinary skill in the art, is set forth in the specification, which makes reference to the appended figures, in which.

Figure 1:
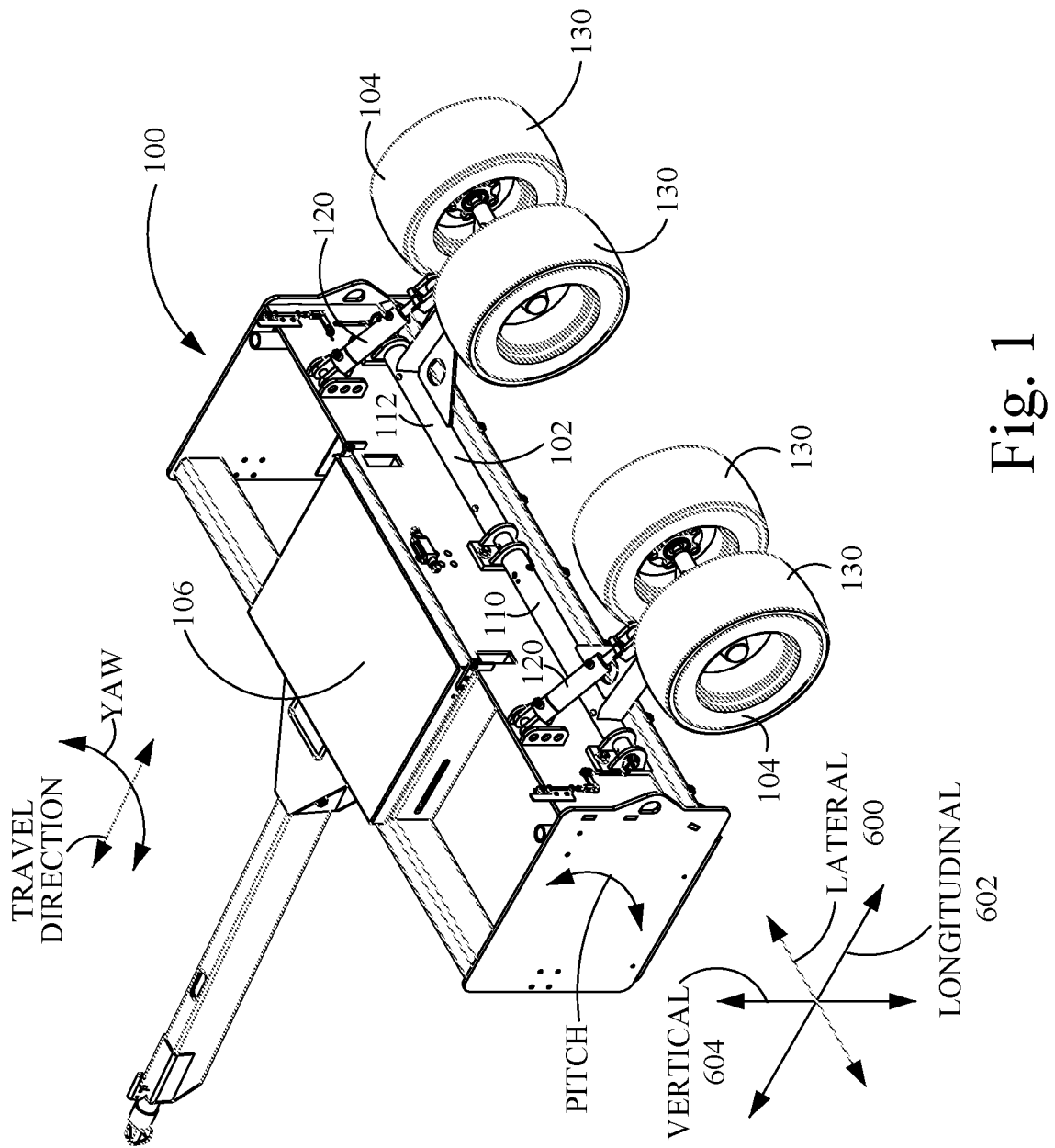
FIG. 1 illustrates an isometric view of one embodiment of the levelling attachment, which can be towed by a vehicle.

Repeat use of reference characters in the present specification and drawings is intended to represent the same or analogous features or elements of the present disclosure.

DETAILED DESCRIPTION OF THE DISCLOSURE

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

The term "proximate" indicates a position on an element that is closest to the vehicle, whereas the term "distal" indicates a position on an element that is furthest away from the vehicle. Dual-headed arrows shown on the figures indicates the ability of a referenced element to change position in a direction generally parallel with the direction of the arrow.

The invention will be described with particular reference to a towable attachment levelling assembly without limit thereto. One of skill in the art would appreciate that the method of control could be utilized with other turf grading or contouring devices. As shown in the figures, the components of the towable attachment levelling assembly include the following:

| Component Number | Description |
| --- | --- |
| 100 | Attachment Levelling Assembly |
| 102 | Transport Pivot Axle Assembly |
| 104 | Wheel Assembly |
| 106 | Towable Attachment Assembly |
| 108 | Wheel Pivot Assembly |
| 109 | Wheel Assembly Yoke |
| 110 | Transport Axle Portion |
| 112 | Transport Axle Portion |
| 114 | Pivot Restraint |
| 115 | Wheel Assembly Yoke Sleeve |
| 116 | Wheel Pivot |
| 118 | Axle Pivot Bearing |
| 120 | Hydraulic Transport/Tilt Cylinder |
| 122 | Tandem Wheel Pivot |

-continued

| Component Number | Description |
| --- | --- |
| 124 | Adjustable Cylinder Tabs |
| 126 | Replaceable Cutting Edge |
| 128 | Hitch |
| 130 | Tires |
| 132 | Radar Beam |
| 134 | Cut Height |
| 136 | Cut Depth |
| 200 | Laser Receiver |
| 201 | Laser Beam |
| 202 | Proportional Hydraulic Valve |
| 203 | Laser Transmitter |
| 204 | Attachment Levelling Assembly Control System |
| 206 | Rotational encoder |
| 208 | Depth sensor knob |
| 210 | Rotational encoder body |
| 212 | Magnetic mount |
| 214 | Display |
| 1000 | Controller Interface |
| 1164 | Autograde Sensor |
| 1196 | Autodepth Sensor |
| 2044 | Slope Sensor |

Figure 2:
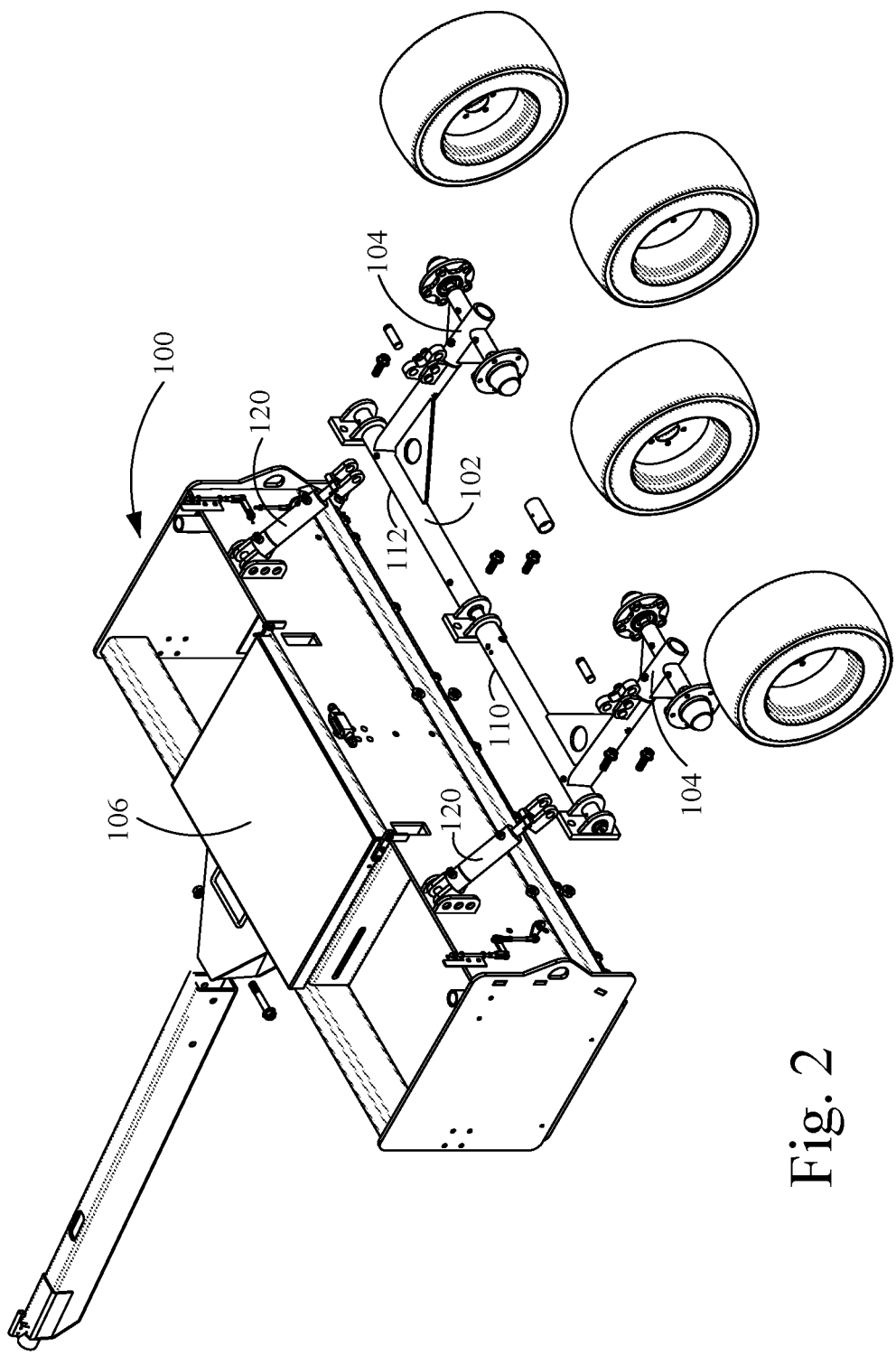
FIG. 2 illustrates an exploded view of one embodiment of the levelling attachment.

FIG. 1 illustrates an isometric view of one embodiment of the attachment levelling assembly 100, which can be towed by a vehicle. The attachment leveling assembly 100 has a transport pivot axle assembly 102, at least two wheel assemblies 104, and a towable attachment assembly 106. The transport pivot axle assembly 102 is removably and rotatably attached to the towable attachment levelling assembly 100. The transport pivot axle assembly 102 has at least two transport axle portions (110, 112) configured to independently rotate about a lateral axis in response to motion of at least two independently operated hydraulic cylinders 120 extending between the towable attachment assembly 106 and the at least two transport axle portions (110, 112). At least two wheel assemblies 104 are removably and rotatably attached to the at least two transport axle portions (110, 112), and the at least two wheel assemblies 104 are configured to independently rotate about a longitudinal axis, 602, within restraint limits imposed by pivot restraint 114, (see FIG. 4) in response to ground contact and rotation of the transport axle assembly 102. The at least two independently operated hydraulic cylinders 120 are configured to respond to control signals from an attachment levelling assembly control system, 204, typically using laser receiver 200 capable of receive a laser beam, 201, from a laser transmitter, 203. FIG. 2 illustrates an exploded view of the same embodiment of the levelling attachment assembly 100. The attachment levelling assembly control system, 204, comprises at least one processor and a non-transitional computer readable storage medium comprising various modules which are configured with instructions executable by the at least one processor for controlling the turf leveling equipment or turf leveling device.

Figure 3:
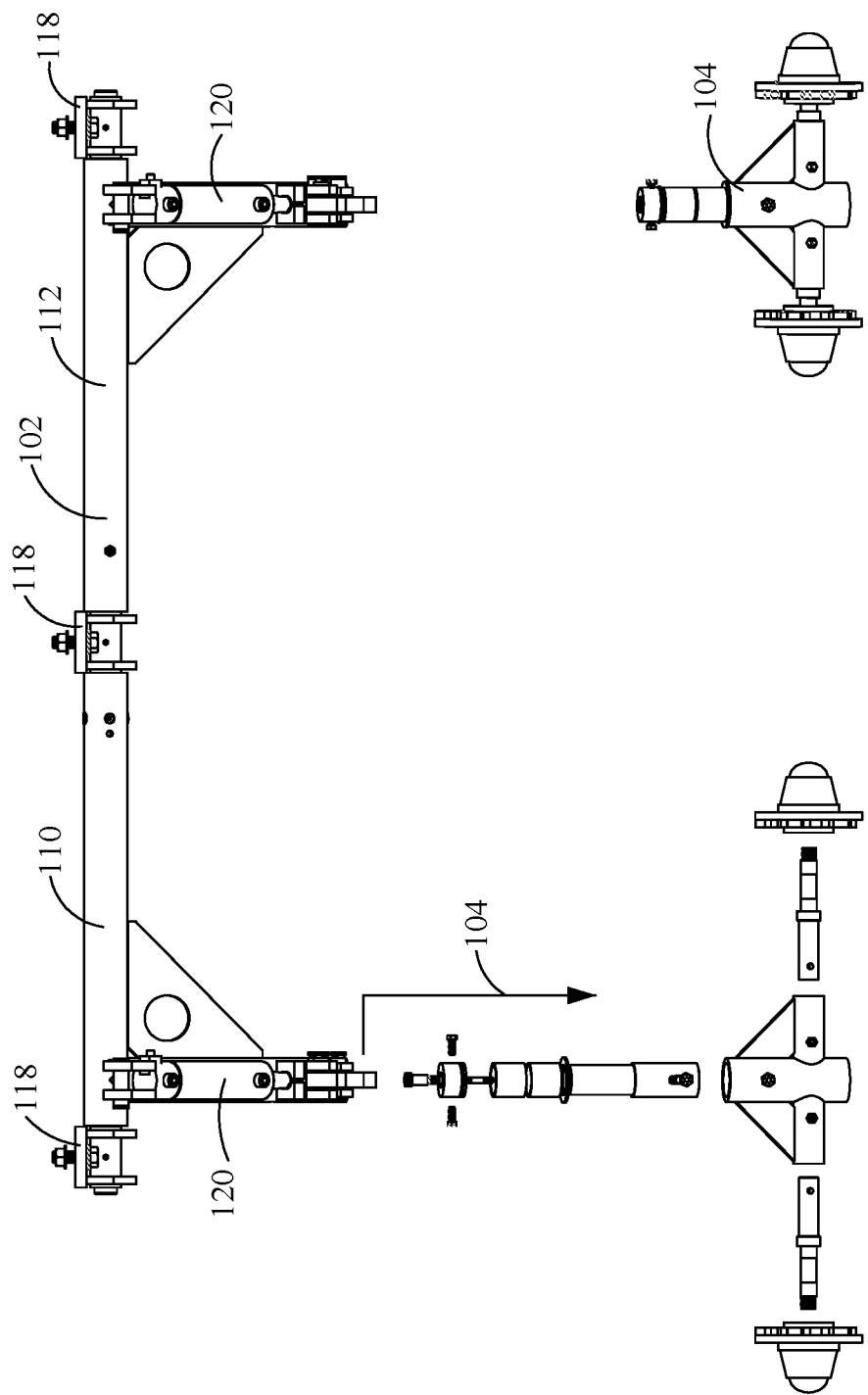
FIG. 3 illustrates a top view of one embodiment of the transport axle assembly and wheel assembly.

FIG. 3 illustrates a top view of one embodiment of the transport axle assembly 102 and two wheel assemblies 104. As shown, two transport axle portions (110, 112) are configured to independently rotate about a lateral axis, 600, in response to motion of at least two independently operated hydraulic cylinders 120 extending between the towable attachment assembly 106 and the two transport axle portions (110, 112).

Figure 4:
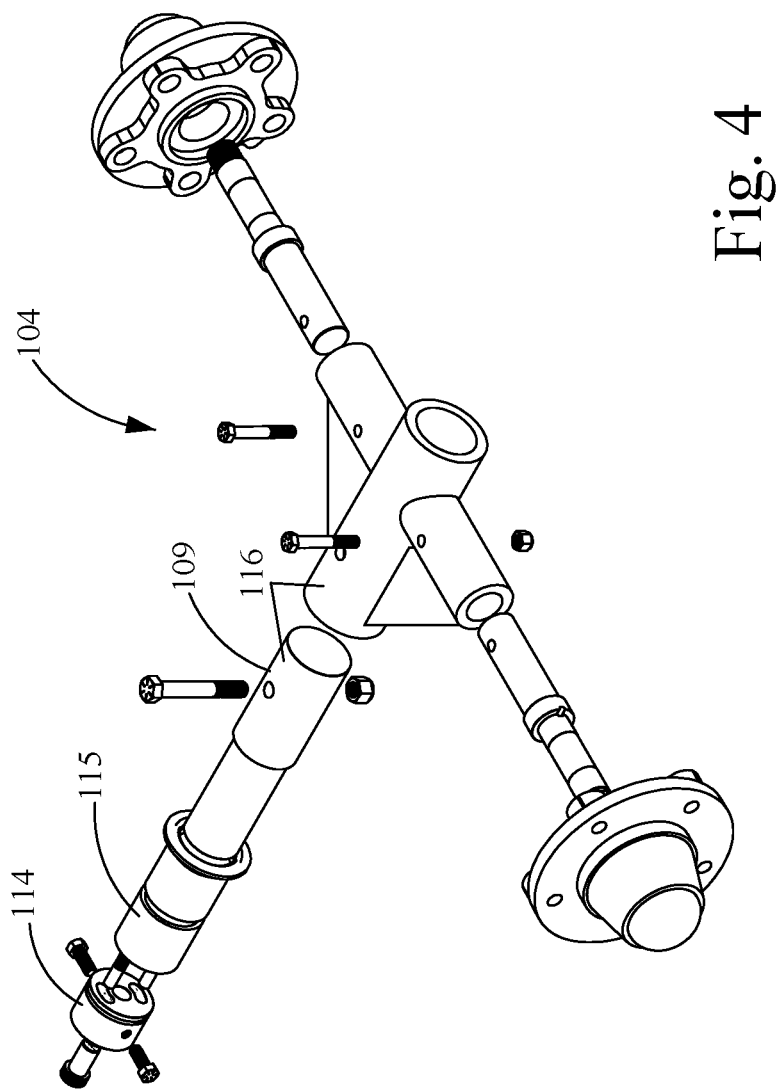
FIG. 4 illustrates an isometric view of one embodiment of the wheel assembly.

FIG. 4 illustrates an isometric view of one embodiment of a wheel assembly 104. The wheel assembly yoke 109 freely rotates inside the wheel assembly yoke sleeve 115 until it reaches the limits of the pivot restraint 114. This allows the wheel assembly 104 to easily recover from loss of ground contact and prevent relative positional binding of the at least two wheel assemblies 104.

Figure 5:
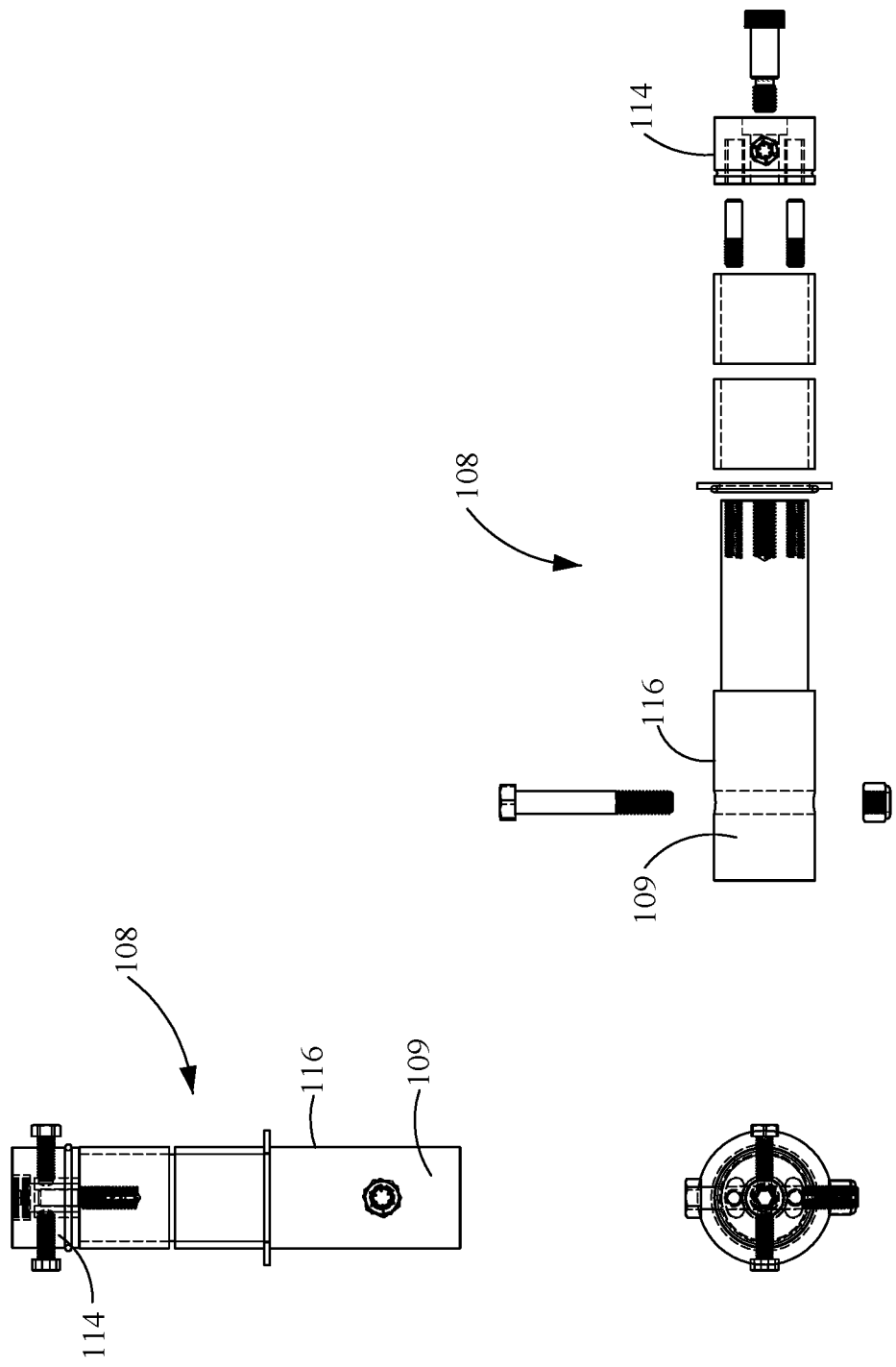
FIG. 5 illustrates components of an embodiment of the wheel assembly pivot restraint.

FIG. 5 illustrates components of an embodiment of the wheel assembly 104 pivot restraint 114. The pivot restraint 114 is the part of the wheel pivot assembly 108 that prevents each wheel assembly yoke 109 from over-rotating around the wheel assembly yoke 109 center axis, thereby allowing the wheel assembly 104 to easily recover from loss of ground contact and prevent relative positional binding of the at least two wheel assemblies 104. Typically, the pivot restraint 114 allows free rotation of each wheel assembly 104 in the pivot range of about ±10 degrees from vertical. The pivot restraint 114 pivot range is adjustable, typically by a stop mechanism configured to vary to stop position at the pivot restraint limits.

Figure 6:
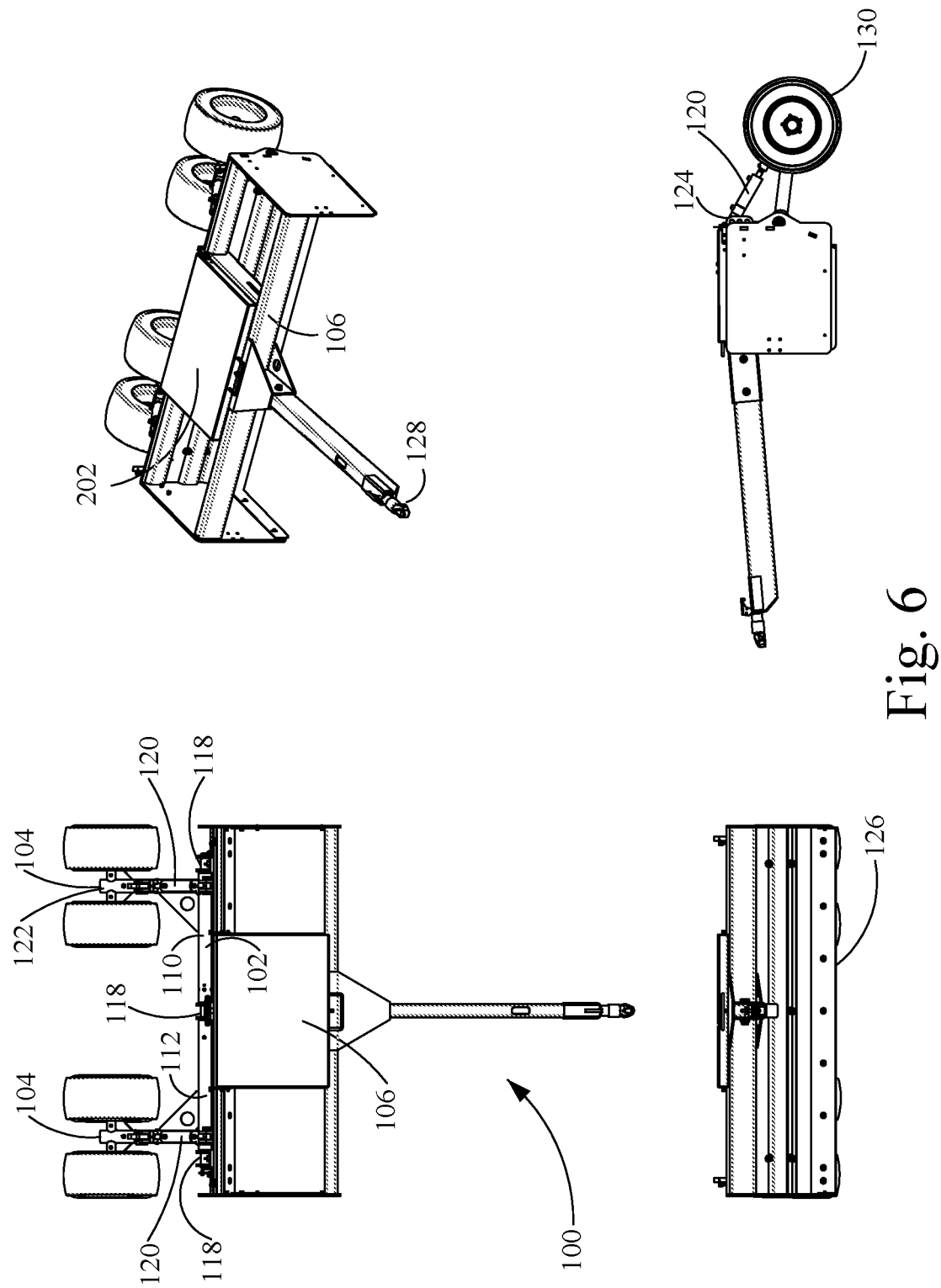
FIG. 6 illustrates multiple views of the attachment levelling assembly without laser masts.
Figure 7:
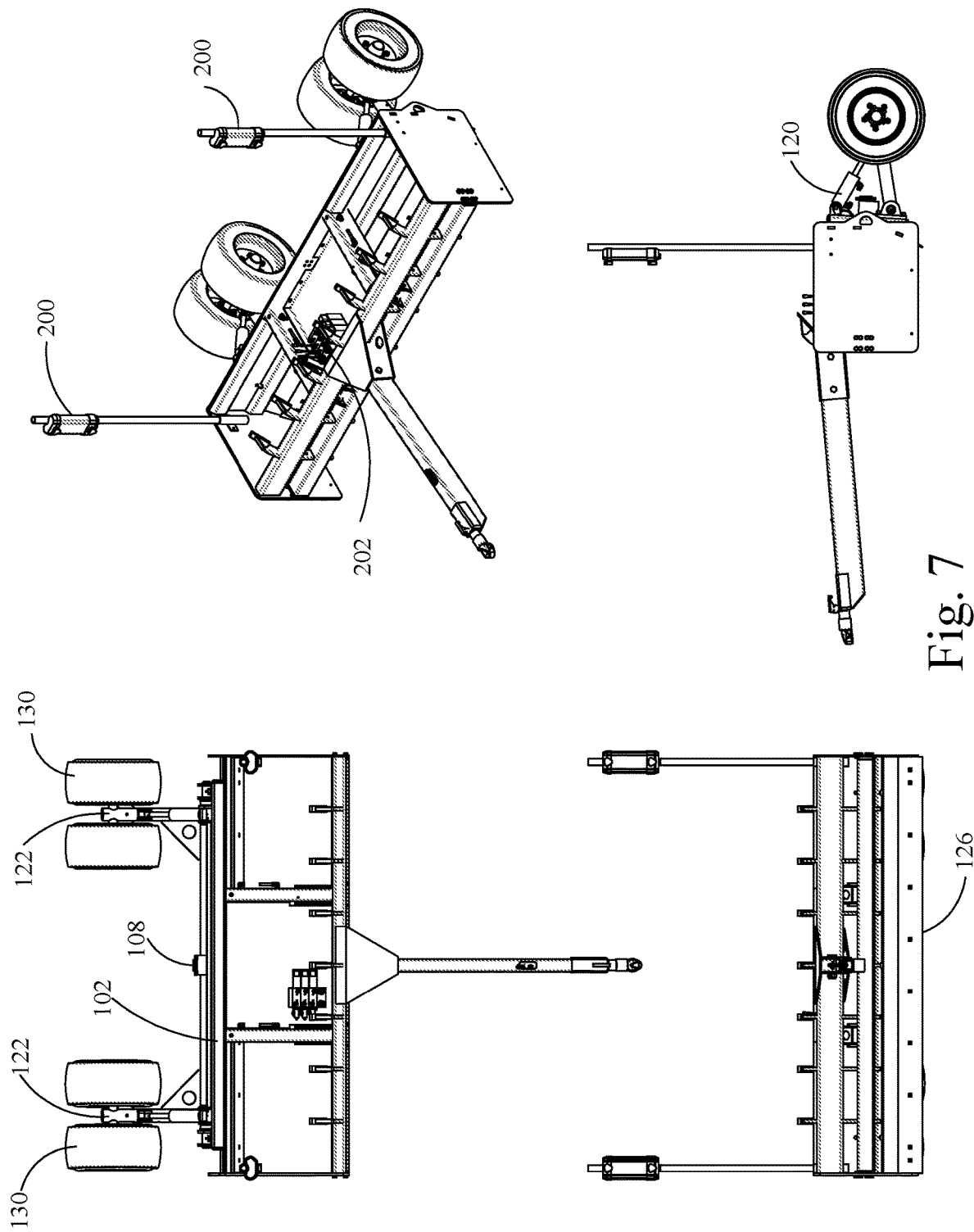
FIG. 7 illustrates multiple views of the attachment levelling assembly with laser masts.

FIG. 6 illustrates multiple views of the attachment levelling assembly 100 without laser masts used as part of the laser control system. Dual proportional control valves 202 independently control each hydraulic transport/tilt cylinder 120 in response to the attachment levelling assembly control system thereby independently lifting and dropping each transport axle section (110, 112). FIG. 7 illustrates multiple views of the attachment levelling assembly 100 with laser masts used as part of laser receiver 200 of the attachment levelling assembly control system.

Figure 8:
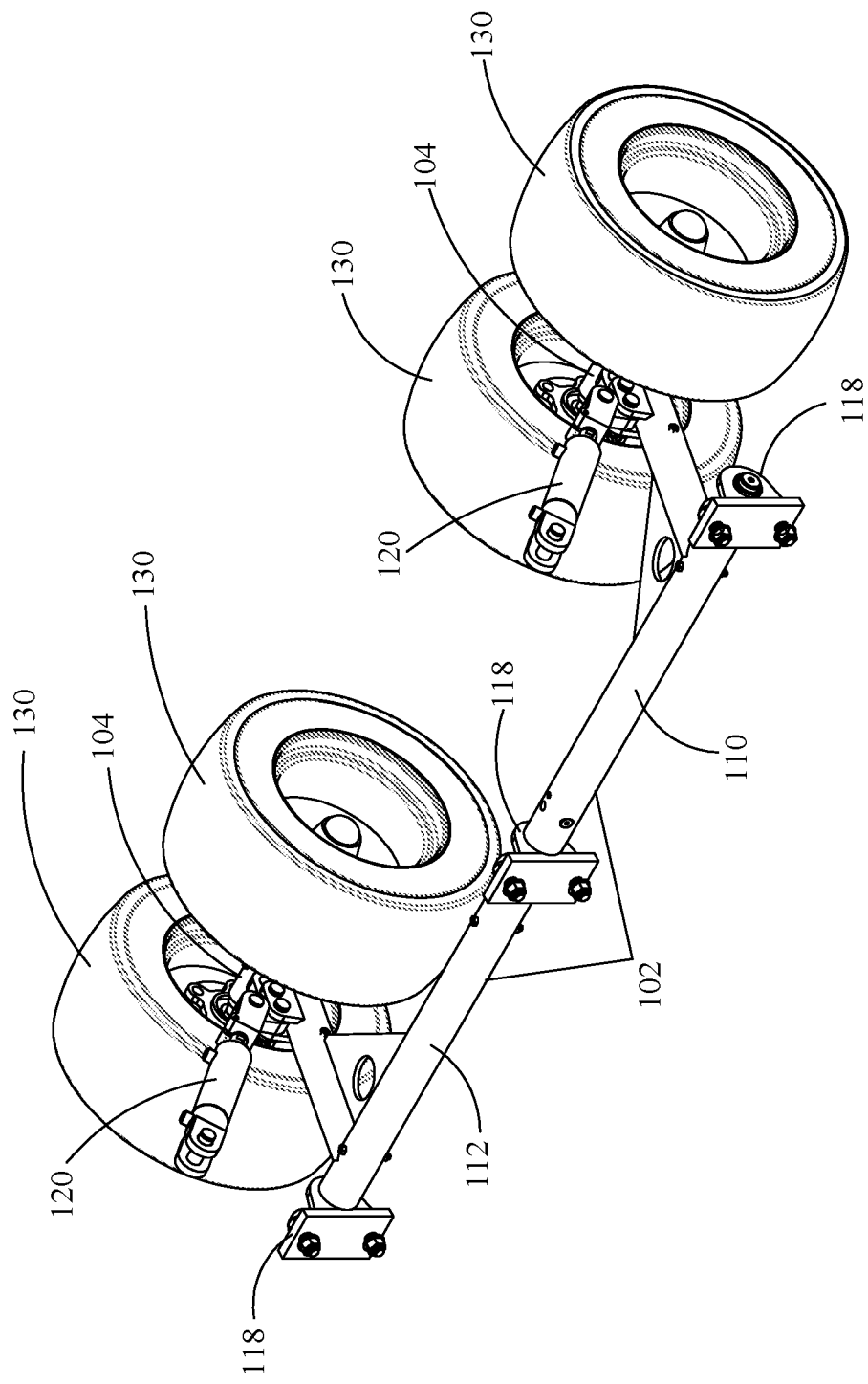
FIG. 8 illustrates an isometric view of the transport pivot axle and wheel assembly with hydraulic cylinders.

FIG. 8 illustrates an isometric view of the transport pivot axle assembly 102 and wheel assembly 104 with hydraulic cylinders 120 that attach to the towable attachment assembly 106 at adjustable cylinder tabs 124.

Figure 9:
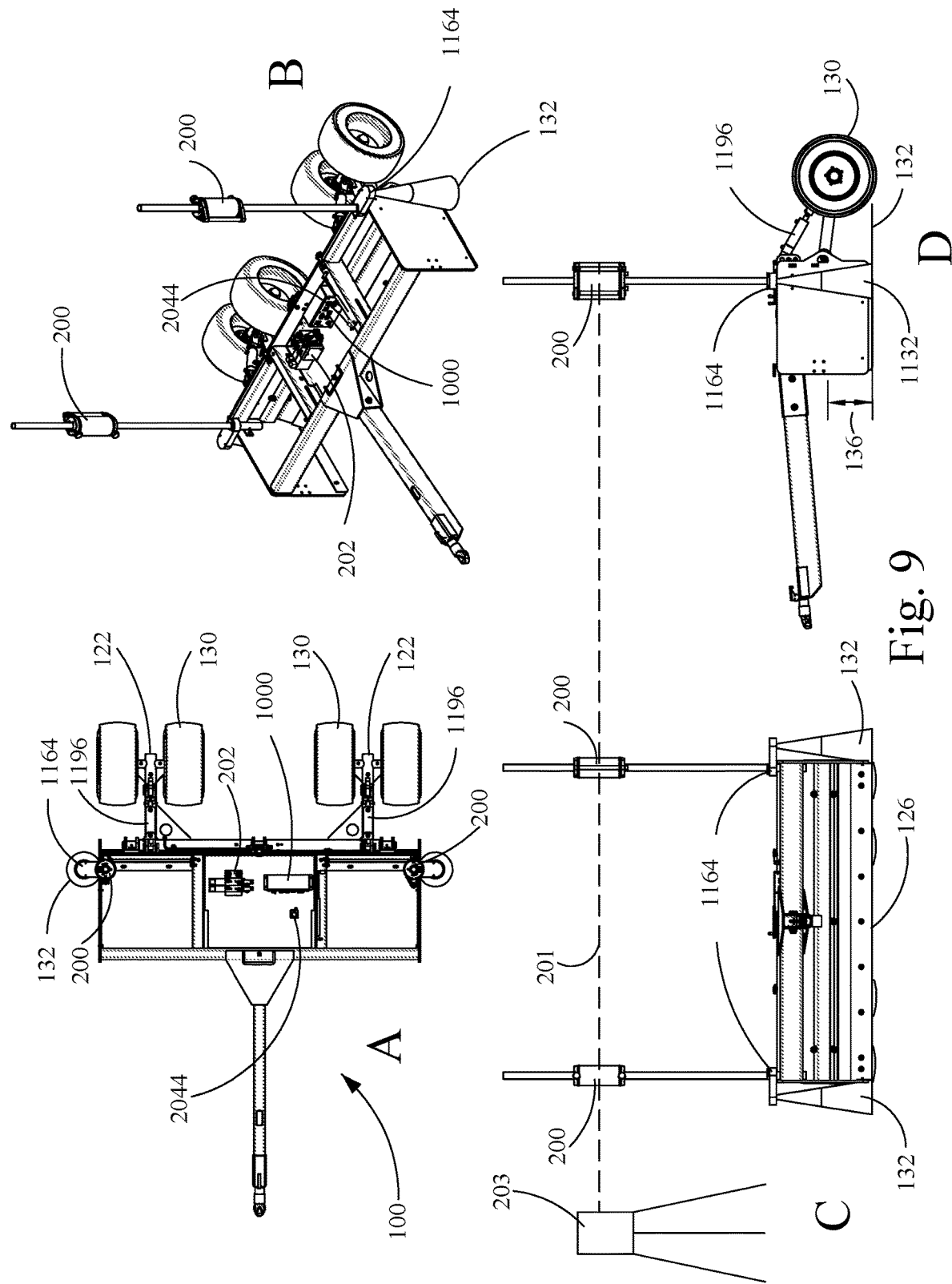
FIG. 9 illustrates multiple views of an embodiment of the invention.

FIG. 9 illustrates embodiments of the invention. FIG. 9A is a top view, FIG. 9B is a top perspective view, FIG. 9C is a front view and FIG. 9D is a left side view. In FIG. 9 a controller interface, 1000, allows for integration of the various sensors with the hydraulic cylinders to provide control of the turf grading equipment as will be described more fully herein.

In FIG. 9 an autograde sensor, 1164, determines a distance from the sensor to an adjacent surface thereby allowing the area being graded to match an adjacent surface without a deviation in height in the lateral 600 direction at the junction of the graded area and adjacent surface. A particularly preferred autograde sensor 1164 is a radar sensor which generates a radar beam, 132. It is well known in the art that a radar sensor sends and receives a radar beam 132 with the time difference there between used to calculate the distance which is communicated to a controller as will be further described herein.

Also in FIG. 9 an autodepth sensor, 1196, monitors the height of the wheels, 130, relative to the cut of the turf grading equipment, 134. If the cut depth, 136, exceeds a predetermined limit, based on the length of the autodepth sensor 1196, the control system 204 may increase the length of the hydraulic transport/lift cylinder, 120, integrated with the autodepth sensor 1196 to a point sufficient to decrease the cut depth 136. An example autodepth sensor measures a travel length of the hydraulic transport/lift cylinder, 120.

In FIG. 9, a slope sensor, 2044, determines the angle of the turf grading equipment relative to lateral direction 600 of FIG. 1. The slope sensor 2044 provides a slope to the attachment leveling control system 204. The attachment leveling assembly control system 204 uses input from at least one of the autograde sensor 1164, the autodepth sensor 1196 and the slope sensor 2044 to control the pitch and yaw of the attachment leveling assembly.

Figure 17:
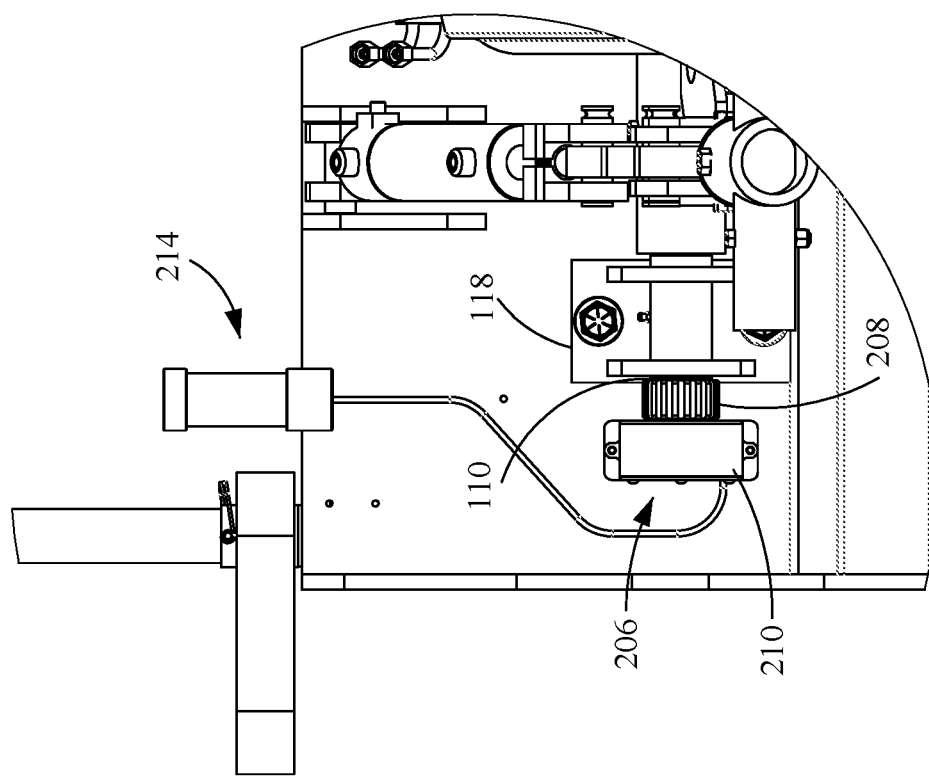
FIG. 17 is a schematic representation of an embodiment of the invention including a rotational encoder.
Figure 16:
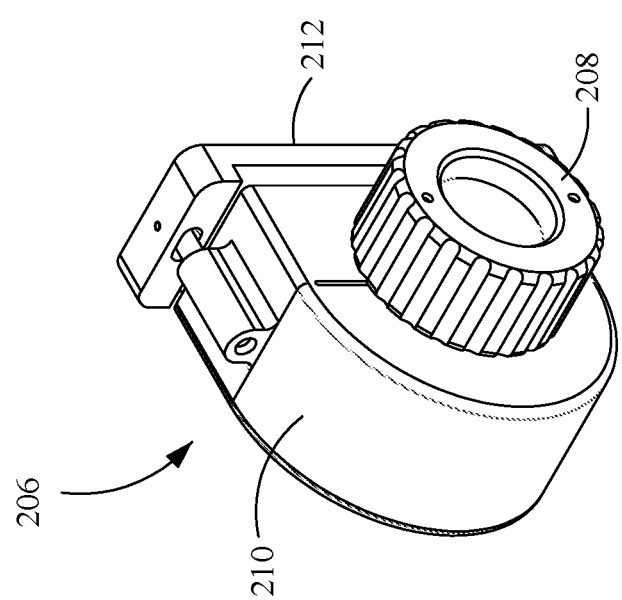
FIG. 16 is a schematic illustration of a rotational encoder.
Figure 18:
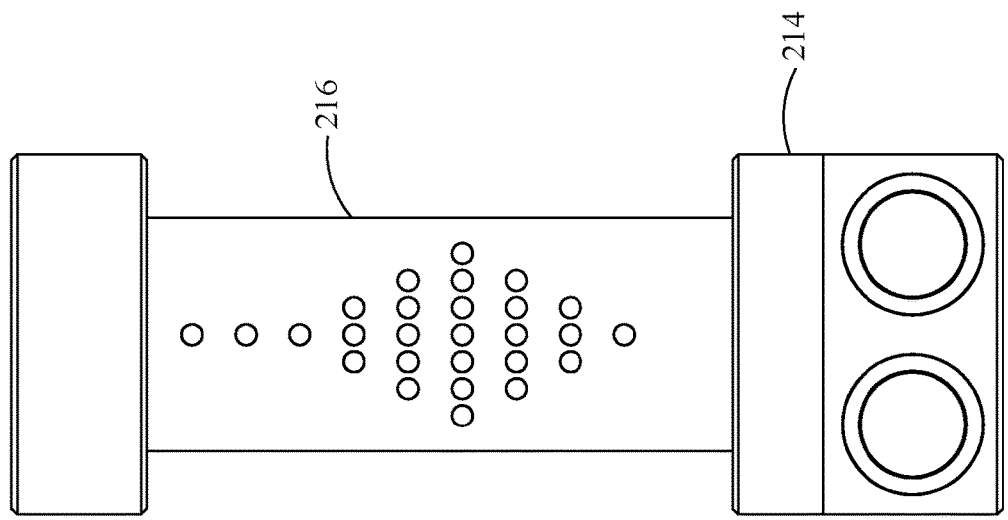
FIG. 18 illustrates an optical display of position feedback for the rotational encoder.

An embodiment of the invention will be described with reference to FIGS. 16 and 17. A rotational encoder, 206, is illustrated in isolated schematic view in FIG. 16 and in functional position in FIG. 17. A display which is in communication with the rotational encoder is illustrated schematically in FIG. 18. The rotational encoder comprises a depth sensor knob, 208 which is rotationally attached to a rotational encoder body, 210. The rotational encoder is attached to the turf grading equipment, such as by a magnetic mount, 212, preferably in proximity to an axle pivot bearing, 118, positioned such that the depth sensor knob, 208, can rotate in concert with a transport axle portion, 110. The display, 214, is mounted in a position suitable for visualization by the operator without limit. The display comprises a height indicator represented in the figures as a series of lights which indicate relative rotational position. In use, the turf grading equipment would be set to a desirable height, referred to as "zero" or "calibrate zero", and the depth sensor knob would be rotated, independent from the transport axle portion, to a desired position wherein the display indicates zero height. The rotation of the transport axle portion would then be coupled with the depth sensor knob. If the transport axle portion rotates clockwise relative to the axle pivot bearing, as viewed from the left side of the turf grading equipment looking parallel to the transport axle portion it would indicate the cutting edge of the turf grading equipment has raised, relative to the axle pivot bearing, and the display would report accordingly. A rotational encoder could be on either side, or both sides, depending on the information of significance.

The rotational encoder and display can communicate by any method known in the art including direct connection, carrier wave communication or by optical sensor communication. Particularly preferred communication techniques include wire connection, radio signal communication, optical signal communication, "blue-tooth", etc.

The method of controlling the turf grading equipment comprises four automatic modes and a manual mode which may be independently utilized. Furthermore, each side may be independently operated in a different mode. One side of the turf grading equipment may be operated in autograde mode, for example, with the other side operated in manual mode, autodepth, mode, laser mode or slope mode. The modes may be utilized in concert with a hierarchy of which mode is a master mode and which mode is subservient. For the purposes of the discussion herein a master mode is a mode which controls the turf grading equipment unless control is ceded to a subservient mode. By way of non-limiting example, a master mode may have predetermined limits within which control is ceded to a subservient mode within the predetermined limits. If beyond the predetermined limits the master control retains control until the predetermined limits are again obtained at which time control is ceded to a subservient mode. A more specific, but non-limiting example, is the master mode being an autodepth mode, which will be more fully described herein, wherein the autodepth mode insures the depth of cut does not exceed a predetermined limit, such as 0 to 4 inches below original grade, 0 to 4 inches above original grade. If the turf grading equipment, such as the exemplary attachment levelling assembly, is operating in a manner wherein the turf manipulation removes no more than 12 inches of turf or dirt the autograde control is ceded to a subservient mode such as laser mode, slope mode, autograde mode or manual mode. If the turf grading equipment approaches the predetermined limit autodepth mode may temporarily override, or suspend, the subservient mode thereby inhibiting the turf grading equipment from exceeding the predetermined limit even though the expected results from slope mode, laser mode, autograde mode or manual may not be achieved during the override. The selection of master mode and subservient mode is not limited and multiple hierarchies may be employed until all available modes are utilized. By way of non-limiting example, a first mode may be subservient to a second mode which is, in turn, subservient to a third mode which is, in turn, subservient to a master mode. An embodiment of the invention will be described with reference to FIGS. 10-15 wherein the method is illustrated schematically in flow-chart representation. Throughout the description of the method the control of each side is independent of the other unless specifically stated otherwise. Any description of the control method is inclusive of controlling a single side, controlling both sides independently or controlling both sides in concert.

In FIGS. 10-15 a controller interface, 1000, allows for primary selection of manual override mode, 1002, or manual override not-active, 1004. In the manual override mode, manual control logic, 1006, is employed which allows for selection of either the two sides being controlled independently, 1008, also referred to as X axis on, or the two sides being controlled in concert, 1010, also referred to as X axis off. Under independent control the manual control logic, 1012, allows for the independent controlling manual raising or lowering of the left side cylinder at 1014, which is referred to as the X axis, or manual raising or lowering of the right side cylinder at 1016, which is referred to as the Y axis. The communication for raising the left side is relayed to a controller, 1020, by a manual control logic module, 1018. The controller, 1020, receives a communication indicating the position of the ram in the cylinder from a transport cylinder sensor, 1022, and based thereon the controller determines if the hydraulic cylinder stroke is within limits at 1024, and, if within limits, manual control logic module, 1026, interfaces with hydraulic control module, 1028, to extend or retract the left transport cylinder at 1030. If the controller, 1020, determines that the transport cylinder stroke is outside of limits at 1032, no action is taken at 1034. The signal for raising the right side is relayed to a controller, 1038, by a manual control logic module, 1036. The controller, 1038, receives a communication indicating the position of the ram in the cylinder from a transport cylinder sensor, 1040, and based thereon the controller determines if the hydraulic cylinder stroke is within limits at 1042, and, if within limits, manual control logic module, 1044, interfaces with hydraulic control module, 1046, to extend or retract the left transport cylinder at 1048. If the controller, 1038, determines that the transport cylinder stroke is outside of limits at 1050, no action is taken at 1052.

If the two sides are to be controlled in concert at 1010, manual control logic, 1054, allows for the simultaneous controlling manual raising or lowering of the both cylinders at 1056. The signal for both sides is relayed to a controller, 1060, by a manual control logic module, 1058. The controller, 1060, receives a communicating indicating the position of the ram in the cylinders from transport cylinder sensor, 1062, and based thereon the controller determines if the hydraulic cylinder stroke is within limits at 1064, and, if within limits, manual control logic module, 1066, interfaces with hydraulic control module, 1068, to extend or retract both transport cylinders at 1070. If the controller, 1060, determines that the transport cylinder stroke is outside of limits at 1072, no action is taken at 1074.

Figure 10:
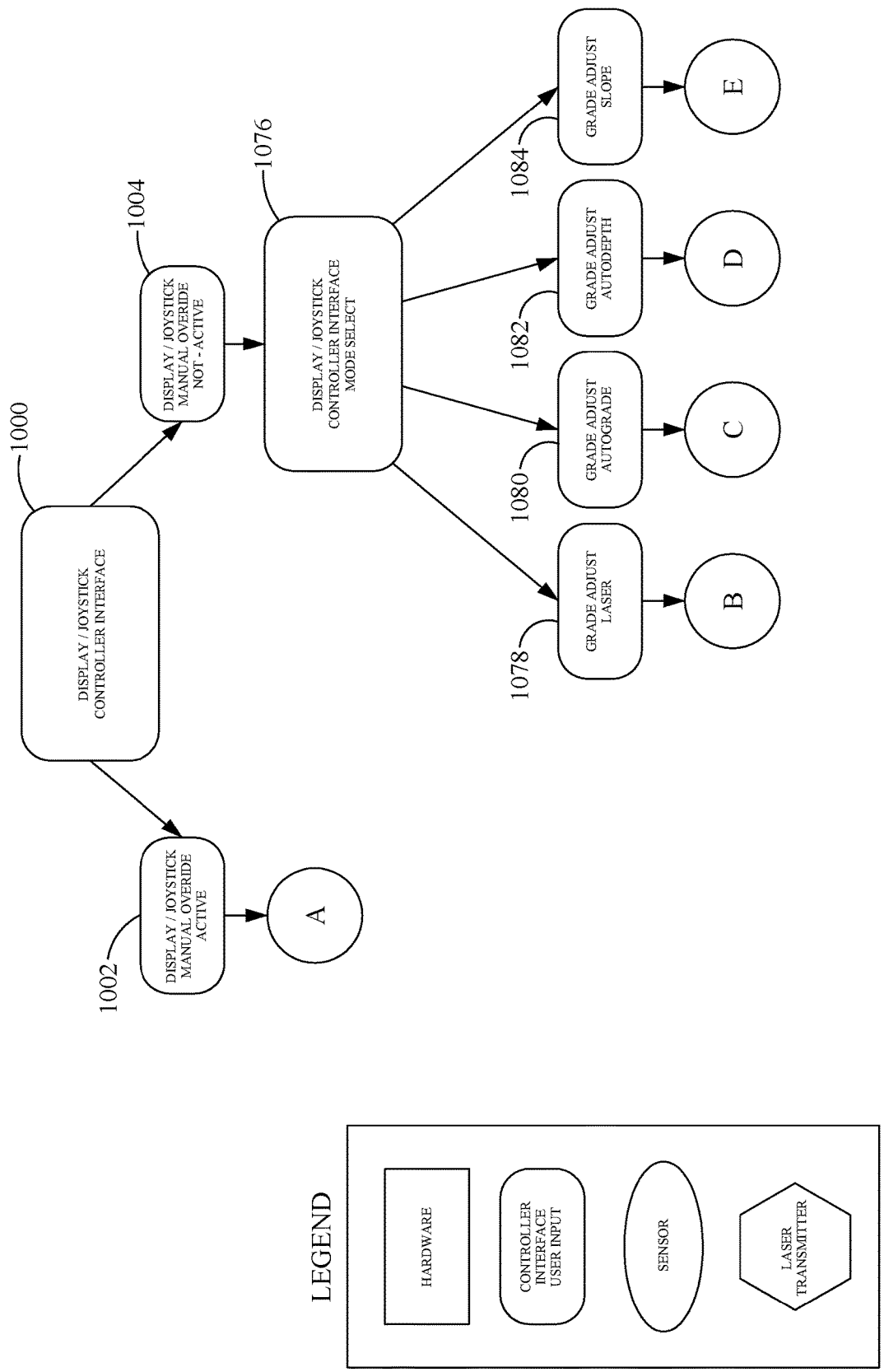
FIGS. 10-15 schematically illustrate an embodiment of the invention.
Figure 11:
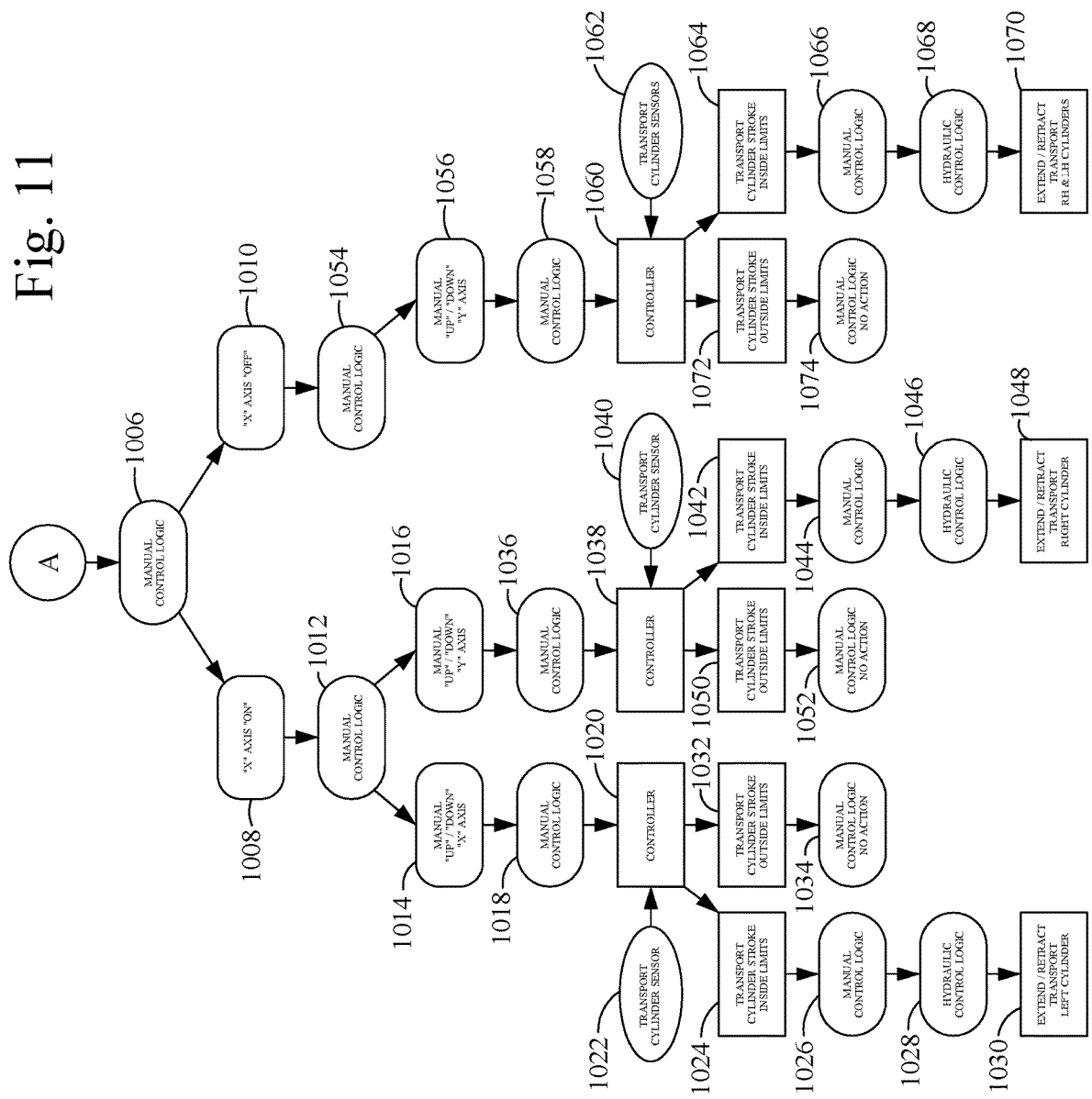
Figure 12:
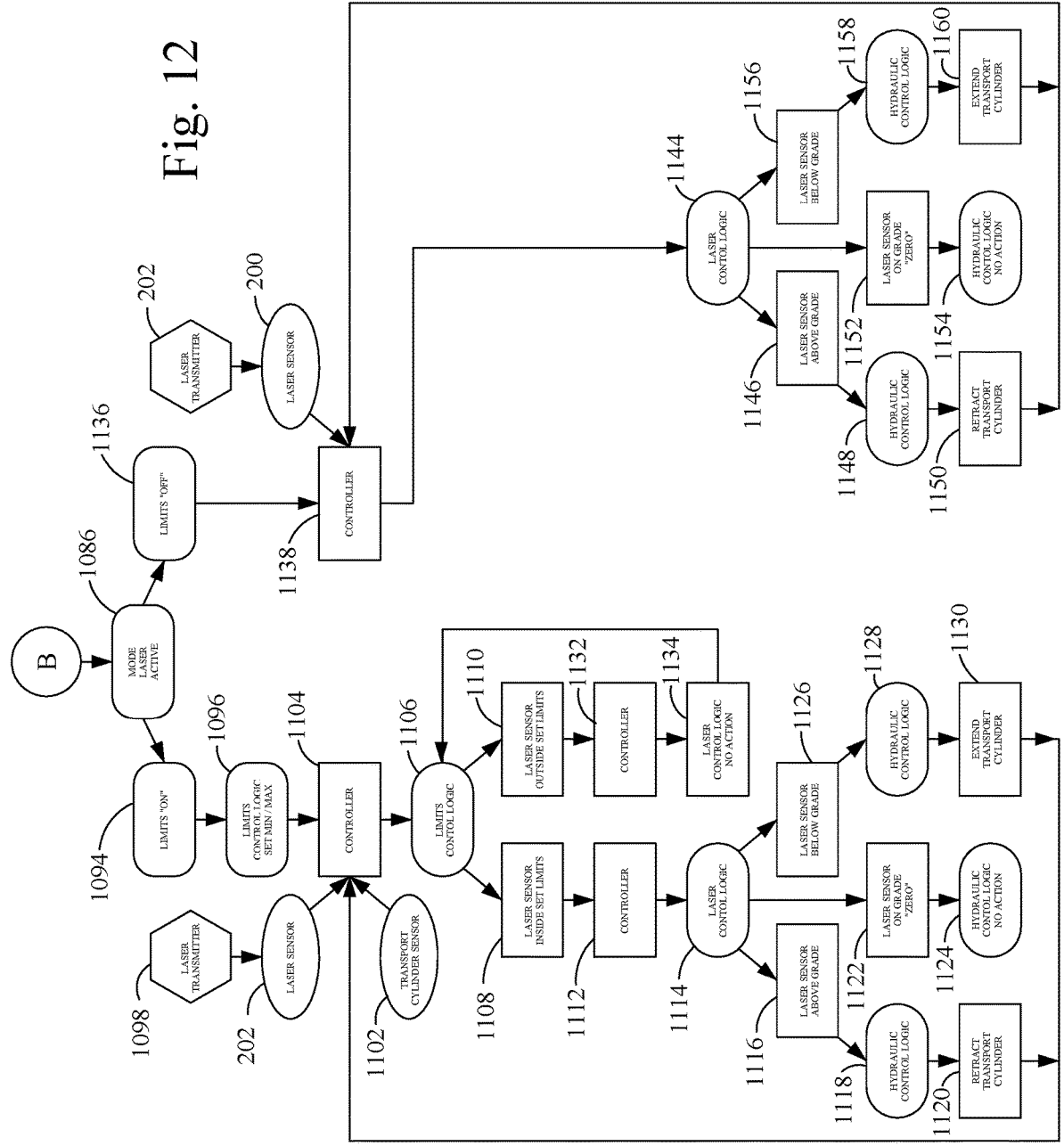
Figure 13:
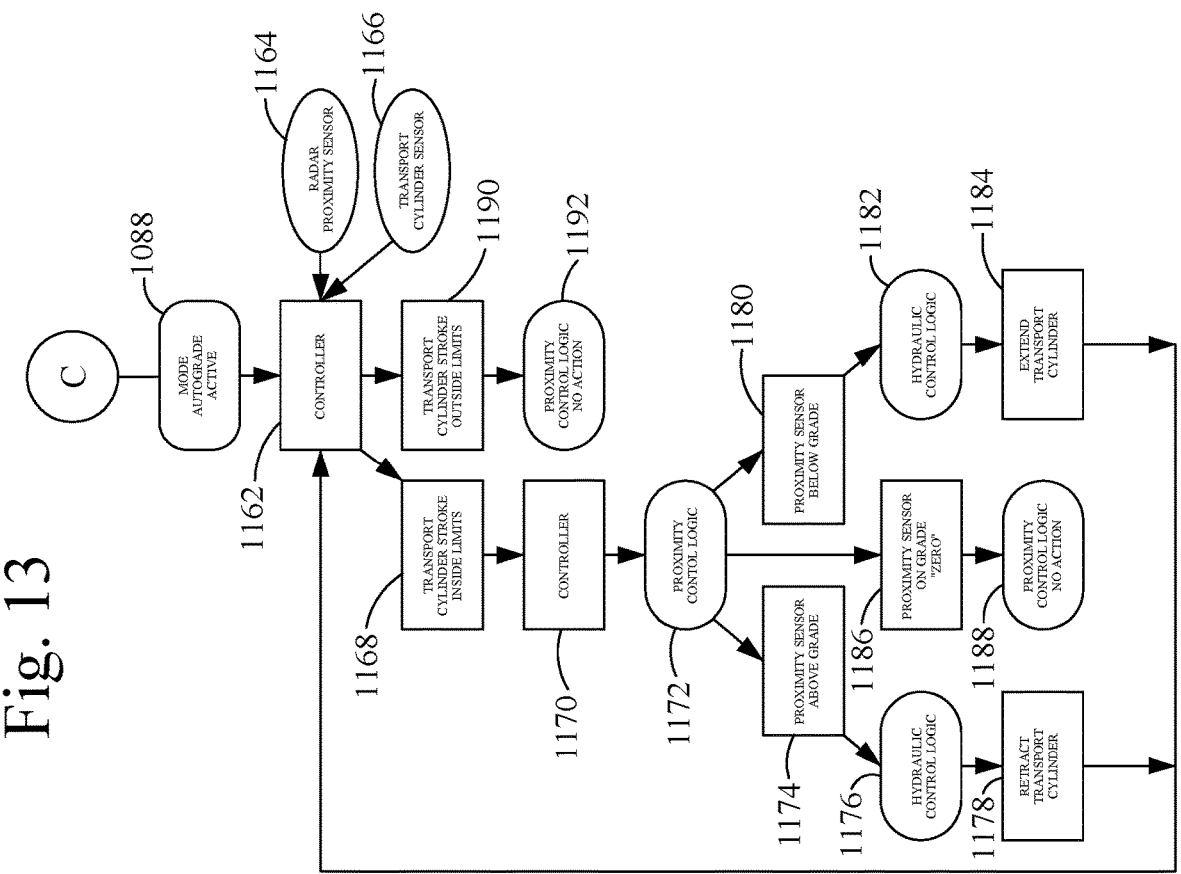
Figure 14:
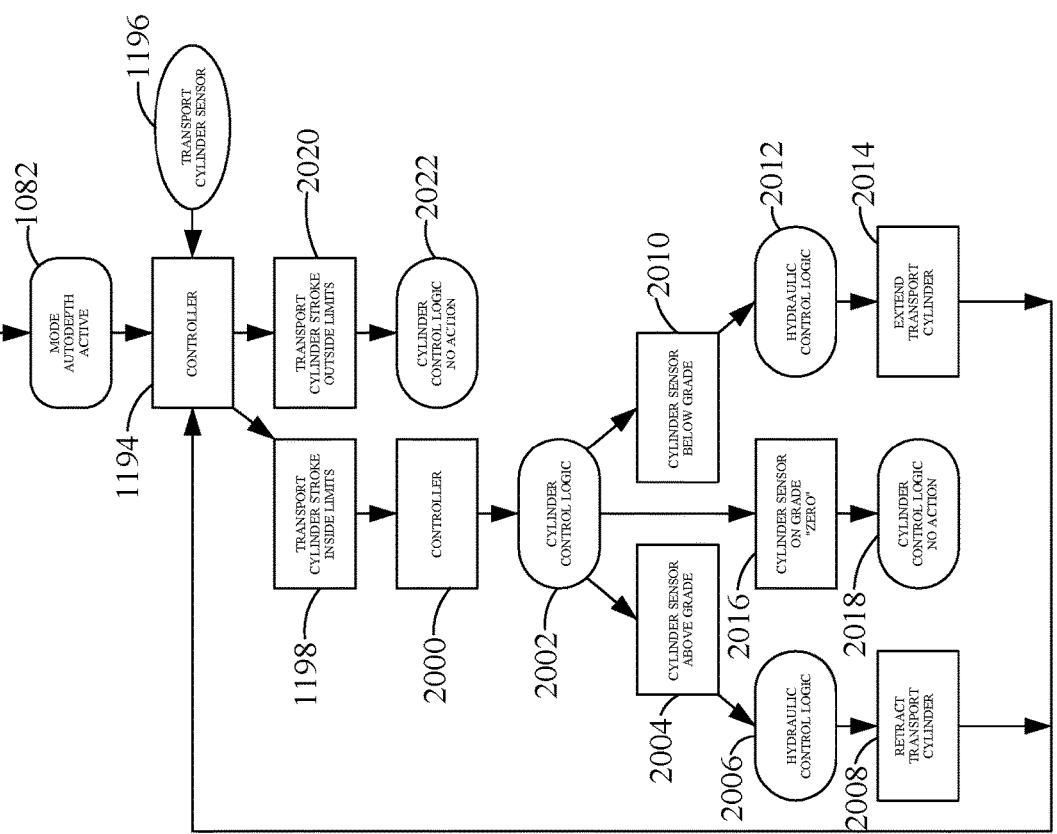
Figure 15:
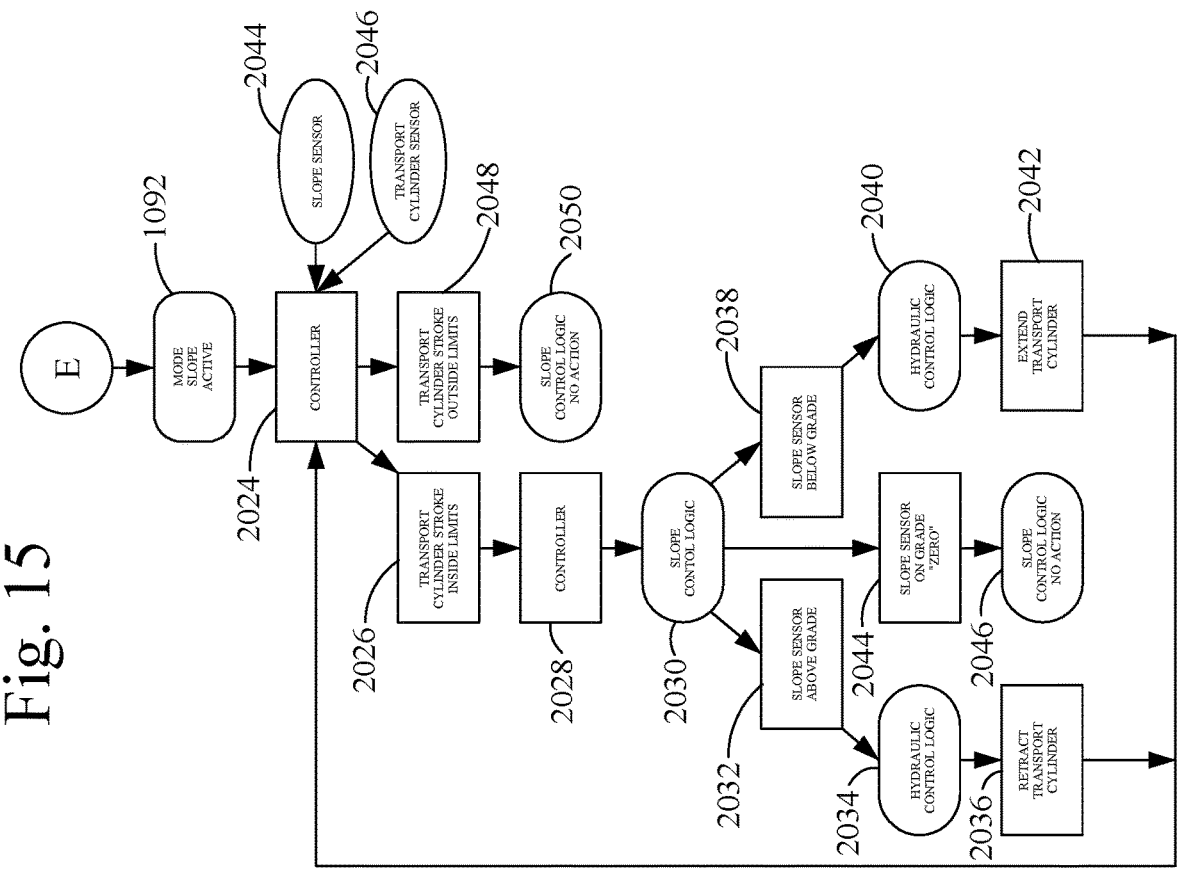

In FIG. 10, manual override not-active, 1004, addresses a module selection mode, 1076, wherein grade laser adjust mode, 1078, is selected for laser mode control. In laser mode a laser is provided from a laser transmitter which provides a preferably planar fan beam. The turf grading equipment comprises at least one laser guidance element which receives the fan beam. The control system determines if the laser guidance element is below or above the laser and either raises or lowers the turf grading equipment accordingly. If no signal is received from the transmitter, or if the signal is interrupted, an alert is provided which is preferably at least one of a visible alert or an audible alert and the cylinder position is frozen until the signal is re-established.

Laser mode active status, 1086, selects limits on, 1094, or limits off, 1136. If limits are used at 1094 the limits are set at 1096 and the limits are communicated to the grade adjust laser module controller, 1104. A laser beam is generated by the laser transmitter, 1098, which is received by the laser sensor, 202, with communication to the grade adjust laser module controller 1104. A transport cylinder sensor, 1102, reports the status of the hydraulic cylinder to the grade adjust laser module controller, 1104, and the limits are communicated to a limits control logic module, 1106. If the laser sensor, 202, is within limits at 1108 a controller, 1112, communicates to a user control logic module, 1114, which monitors if the laser sensor is above grade at 1116 and, if above grade, hydraulic control logic, 1118, communicates with the hydraulic to retract the hydraulic cylinder at 1020 with communication back to grade adjust laser module controller 1104 for continued monitoring of the position of the laser sensor, 202, relative to the limits. If the laser sensor is on grade, indicated by a zero offset from the limit range at 1122 no action is taken by the hydraulic control logic at 1124. If the laser sensor, 202, is within limits at 1108 a controller, 1112, communicates to a user control logic module, 1114, which monitors if the laser sensor is below grade at 1126 and, if below grade, hydraulic control logic, 1128, communicates with the hydraulic to extend the hydraulic cylinder at 1030 with communication back to grade adjust laser module controller 1104 for continued monitoring of the position of the laser sensor, 202, relative to the limits. If the laser sensor, 202, is outside of the limits at 1110 controller 1132 communications no action at 1134 with communication back to the limits control logic 1106.

Operation in laser mode without limits at 1136 is communicated with controller 1138. A laser beam is generated by the laser transmitter, 202, which is received by the laser sensor, 200, with communication to the controller 1138. Controller 1138 communicates with laser control logic 1144 which determines if the laser sensor is above grade at 1146 and, if above grade, hydraulic control logic, 1148, communicates with the hydraulic to retract the hydraulic cylinder at 1150 with communication back to controller 1138 for continued monitoring of the position of the laser sensor, 200. If the laser sensor is on grade, indicated by a zero offset at 1152, no action is taken by the hydraulic control logic at 1154. If the laser sensor is below grade at 1156 hydraulic control logic, 1158, communicates with the hydraulic to extend the hydraulic cylinder at 1060 with communication back to controller 1138 for continued monitoring of the position of the laser sensor.

In autograde mode the turf grading equipment comprises a sensor which determines the vertical proximity of the turf grading equipment relative to the adjacent surface. In autograde mode at least the side of the turf grading equipment closest to an adjacent surface to be followed is controlled by autograde mode to cut and fill surface material as needed to match the adjacent surface grade. The side closest to the adjacent surface is therefore mimicked which eliminates any variation in the surface perpendicular to the direction of travel at the interface of adjacent surface and surface being graded. The adjacent surface may be a previously graded surface or it may be a hard surface such as a sidewalk or driveway wherein a smooth transition is desired.

Manual override not-active, 1004, addresses a module selection node, 1076, wherein grade adjust autograde mode, 1080, is selected for autograde mode control, 1088. Operation in autograde mode is communicated with autograde controller 1162. Autodepth sensor, 1164, communicates the height relative to an adjacent surface to be mimicked to autograde controller 1162. Transport cylinder sensor 1166 communicates the position of the hydraulic cylinder to autograde controller 1162. If the height relative to the adjacent surface is within limits at 1168 communication with controller 1170 communicates with proximity control logic module, 1172, for control. If the autodepth sensor is above grade at 1174 hydraulic control logic module 1176 communicates with the hydraulic cylinder to retract the transport cylinder at 1178 with communication back to autograde controller 1162 for continued monitor. If the autodepth sensor is below grade at 1180 hydraulic control logic module 1182 communicates with the hydraulic cylinder to extend the transport cylinder at 1184 with communication back to autograde controller 1162 for continued monitor. If the autodepth sensor is on grade at 1186 no action is taken at 1188.

Manual override not-active, 1004, addresses a module selection node, 1076, wherein grade adjust autodepth mode, 1082, is selected for autodepth mode control. In autodepth mode the turf grading equipment comprises a sensor; such as a skid which rides on the surface being graded or a measurement device which determines the vertical proximity of the turf grading equipment relative to the surface being graded. Any device capable of measuring or determining a distance from the device to the surface preferably immediately ahead of the grading operation is sufficient for demonstration of the invention. In autodepth mode the depth of cut will not exceed a predetermined depth. Alternatively, if a significant void is reached the autodepth mode insures the grading operation does not seek to reach the bottom of the void. Autodepth mode is preferably set and zeroed after grade adjust is applied. Operation in autodepth mode is communicated with transport cylinder controller 1194. Autodepth sensor 1196 communicates the position of the hydraulic cylinder to transport cylinder controller 1194. If the transport cylinder is within limits at 1198 communication with controller 2000 communicates with cylinder control logic module, 2002, for control. If the autodepth sensor is above grade at 2004 hydraulic control logic module 2006 communicates with the hydraulic cylinder to retract the transport cylinder at 2008 with communication back to transport cylinder controller 1194 for continued monitoring. If the autodepth sensor is below grade at 2010 hydraulic control logic module 2012 communicates with the hydraulic cylinder to extend the transport cylinder at 2014 with communication back to transport cylinder controller 1194 for continued monitoring. If the autodepth sensor is on grade at 2016 no action is taken at 2018. If the transport cylinder stroke is outside of limits at 2020 no action is taken at 2022.

Manual override not-active, 1004, addresses a module selection node, 1076, wherein grade adjust slope mode, 1084, is selected for slope mode control, 1092. Operation in slope mode is communicated with slope controller 2024. In slope mode the level of the turf grading equipment is maintained. In slope mode the sides are controlled separately yet the distance of travel up and down is maintained in concert so that the slope across the turf grading equipment maintains the same slope. By way of example, if the predetermined angle is 5° relative to a standard, such as gravity or a laser fan beam, the same predetermined angle will be maintained. Slope mode is particularly advantageous when used in concert with another mode, such as autograde mode, wherein autograde mode insures the contour of an adjacent surface is followed and slope mode insures a defined slope from the adjacent surface.

Slope sensor, 2044, communicates the slope to slope controller 2024. Transport cylinder sensor 2046 communicates the position of the hydraulic cylinder to slope controller 2024. If the slope is within limits at 2026 communication with controller 2028 communicates with slope control logic module, 2030, for control. If the slope sensor is above grade at 2032 hydraulic control logic module 2034 communicates with the hydraulic cylinder to retract the transport cylinder at 2036 with communication back to slope controller 2024 for continued monitoring. If the slope sensor is below grade at 2038 hydraulic control logic module 2040 communicates with the hydraulic cylinder to extend the transport cylinder at 2042 with communication back to slope controller 2024 for continued monitor. If the slope sensor is on grade at 2044 no action is taken at 2046.

Figure 19:
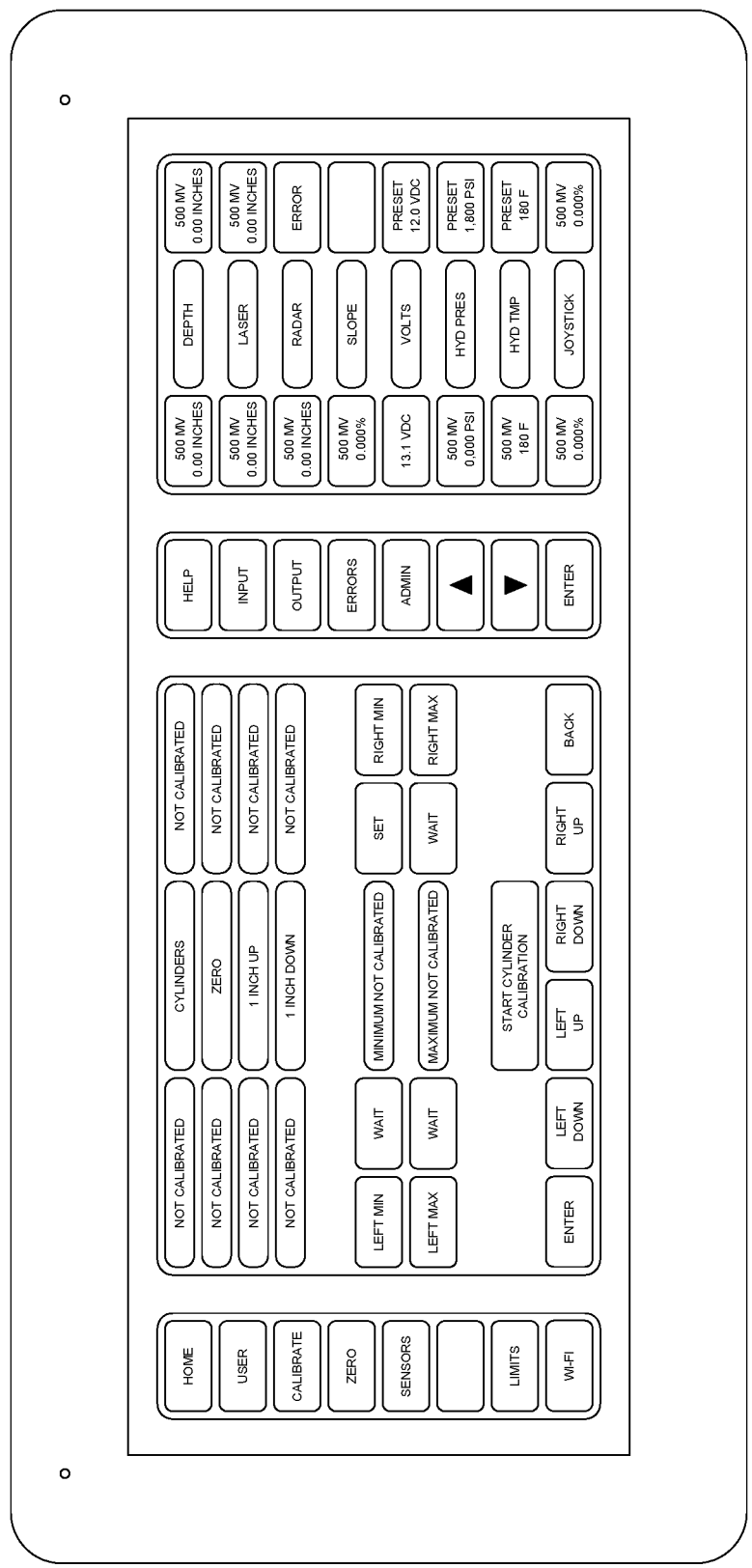
FIG. 19 illustrates a calibration display for the controller interface.
Figure 20:
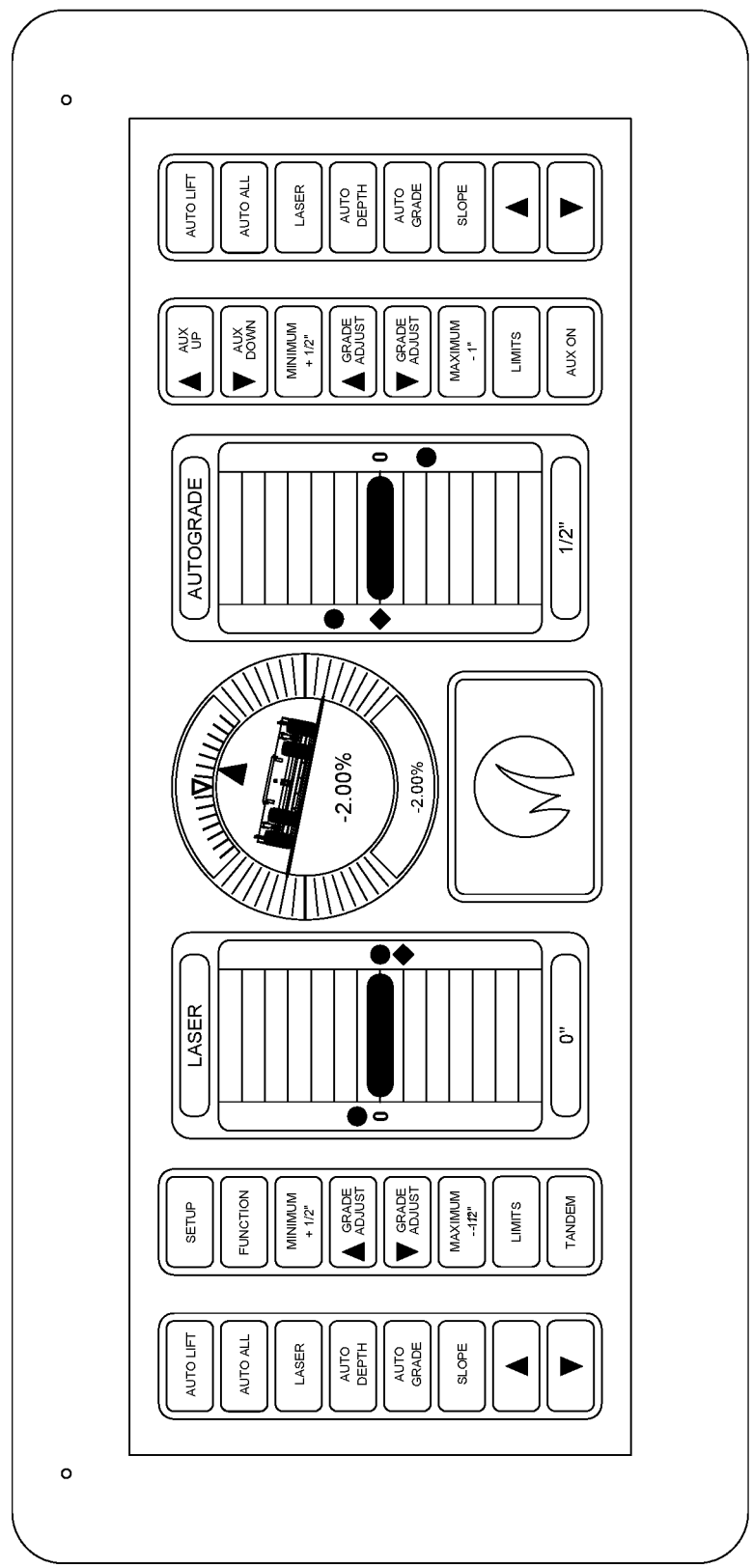
FIG. 20 illustrates a home screen display for the controller interface.
Figure 21:
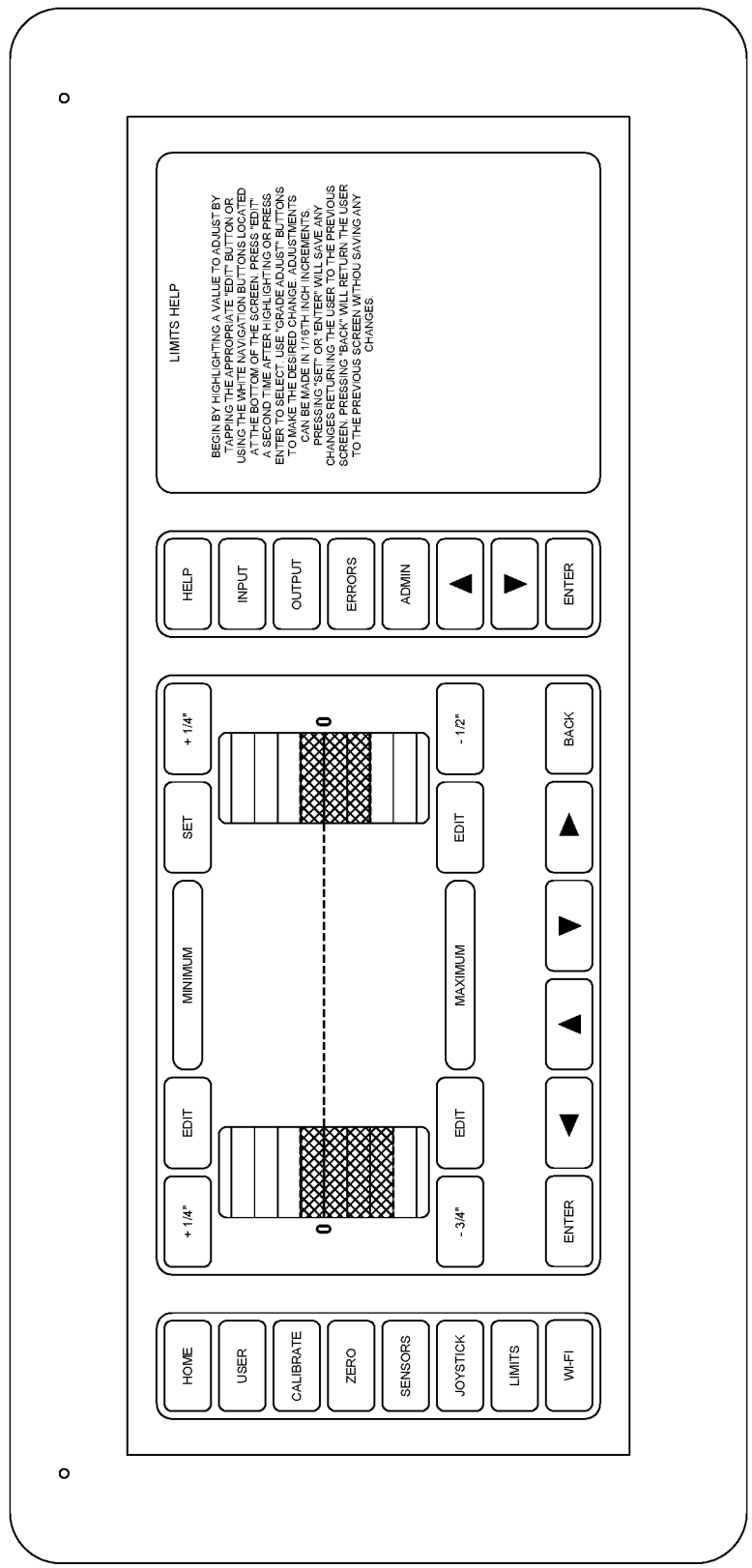
FIG. 21 illustrates a limits display for the controller interface.

FIG. 19 illustrates a calibration display for the controller interface wherein all of the control functions are 'calibrated zero' to establish a zero position reference point. FIG. 20 illustrates a home screen display for the controller interface where the operator is monitoring control operations of the laser and autograde modes. Other control modes can be monitored by selecting the mode from the screen. Other modes accessible from the home screen include setup mode for preparing the grading equipment for operation. FIG. 21 illustrates a limits display for the controller interface to establish and edit controller operation limits as needed.

This written description uses examples of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling turf grading equipment comprising:
    a turf grading device wherein said turf grading device is moved longitudinally over an area and said turf grading device comprises a left side and a right side with each side being able to independently move vertically and said left side and said right side move in concert provide a motion of pitch and yaw;
    a control system for said turf grading device wherein said control system controls movement of said left side and said right side independently wherein said control system comprises:
    a controller interface capable of selecting between a manual override mode and a module selection mode wherein said module selection mode selects from a grade adjust laser mode, a grade adjust autograde mode, a grade adjust autodepth mode and a grade adjust slope mode; wherein said grade adjust laser mode comprises a laser transmitter in a fixed location relative to said area wherein said laser transmitter transmits a laser beam over said area;
    at least one laser sensor on said turf grading device wherein said laser sensor moves in concert with said left side or said right side;
    a grade adjust laser mode controller capable of determining a location of said laser sensor relative to said laser beam and relaying a laser instruction to a laser control logic module wherein said laser control module actuates a transport cylinder to move said right side or said left side vertically;
    wherein said grade adjust autograde mode comprises at least one radar proximity sensor, and wherein said radar proximity sensor moves in concert with said left side or said right side and detects a height above said area;
        an autograde controller receives said height and relays a height signal to a proximity control logic module wherein said proximity control logic module actuates said transport cylinder to move said right side or said left side vertically;
    wherein said grade adjust autodepth mode comprises at least one transport cylinder sensor wherein said transport cylinder sensor determines the extent of extension of said transport cylinder and relays said extension to a transport cylinder controller wherein said transport cylinder controller relays said extension to a cylinder control logic module which actuates said transport cylinder to move said right side or said left side vertically; and
    wherein said grade adjust slope mode comprises a slope sensor which determines an angle of said turf grading device relative to a lateral direction and relays said angle to a slope controller wherein said slope controller relays said slope to a slope control logic module wherein said slop control logic module actuates said transport cylinder to move said right side or said left side vertically to adjust said yaw of said turf grading device.

2. The system for controlling turf grading equipment of claim 1 wherein said grade adjusting laser mode comprises two laser sensors wherein one laser sensor of said laser sensors moves in concert with said left side and a second laser sensor of said laser sensors move in concert with said right side.

3. The system for controlling turf grading equipment of claim 1 further comprising a rotational encoder capable of rotating in concert with an axle pivot bearing of said turf grading device wherein said degree of rotation of said rotational encoder correlates to said height.

4. The system for controlling turf grading equipment of claim 3 further comprising a display for indicating said height.

5. The system for controlling turf grading equipment of claim 1 comprising two radar proximity sensors wherein one radar proximity sensor of said radar proximity sensors moves in concert with said left side and a second radar proximity sensor of said radar proximity sensors moves in concert with said right side.

6. The system for controlling turf grading equipment of claim 1 wherein said slope sensor further controls a pitch of said turf grading device.

7. A method for controlling turf grading equipment comprising:
    providing a turf grading device and moving said turf grading device longitudinally over an area wherein said turf grading device comprises a left side and a right side with each side being able to independently move vertically and said left side and said right side move in concert to provide a motion of pitch and yaw;

moving said left side and said right side independently by a control system comprising:

selecting between a manual override mode and a module selection mode wherein said module selection mode selected from a grade adjust laser mode, a grade adjust autograde mode, a grade adjust autodepth mode and a grade adjust slope mode by a controller interface;

transmitting a laser beam over said area by a laser transmitter, when said grade adjust laser mode is selected, wherein said laser transmitter is in a fixed location relative to said area;

detecting said laser beam by at least one laser sensor on said turf grading device wherein said laser sensor moves in concert with said left side or said right side of said turf grading device;

determining a location of said laser sensor relative to said laser beam by a grade adjust laser mode controller and actuating a transport cylinder to move said right side or said left side vertically by a laser control logic module;

determining a height above said area by at least one radar proximity sensor, when in said grade adjust autograde mode, wherein said radar proximity sensor moves in concert with said left side or said right side of said turf grading device;

receiving said height by a autograde controller and relaying a height signal to a proximity control logic module wherein said proximity control logic module actuates said transport cylinder to move said right side or said left side vertically;

determining the extent of extension of said transport cylinder by at least one transport cylinder sensor when in said grade adjust autodepth mode wherein said transport cylinder sensor relays said extension to a transport cylinder controller wherein said transport cylinder controller relays said extension to a cylinder control logic module which actuates said transport cylinder to move said right side or said left side vertically; and determining a slope by a slope sensor, when in said grade adjust slope mode, wherein said slope sensor determines an angle of said turf grading device relative to a lateral direction and relays said angle to a slope controller wherein said slope controller relays said slope to a slope control logic module wherein said slop control logic module actuates said transport cylinder to move said right side or said left side vertically to adjust said yaw of said turf grading device.

8. The method for controlling turf grading equipment of claim 7 wherein said grade adjusting laser mode comprises two laser sensors wherein one laser sensor of said laser sensors moves in concert with said left side and a second laser sensor of said laser sensors move in concert with said right side.

9. The method for controlling turf grading equipment of claim 7 further comprising a rotational encoder capable of rotating in concert with an axle pivot bearing of said turf grading device wherein said degree of rotation of said rotational encoder correlates to said height.

10. The method for controlling turf grading equipment of claim 9 further comprising a display for indicating said height.

11. The method for controlling turf grading equipment of claim 7 comprising two radar proximity sensors wherein one radar proximity sensor of said radar proximity sensors moves in concert with said left side and a second radar proximity sensor of said radar proximity sensors moves in concert with said right side.

12. The method for controlling turf grading equipment of claim 7 wherein said slope sensor further controls a pitch of said turf grading device.

13. A non-transitional computer readable storage medium for processing controlling of a turf grading device wherein:

said turf grading device is moved longitudinally over an area and said turf grading device comprises a left side and a right side with each side being able to independently move vertically and said left side and said right side move in concert to provide a motion of pitch and yaw;

wherein said non-transitional computer readable storage medium comprises:

a control system module for said turf grading device wherein said control system module controls movement of said left side and said right side independently wherein said control system module comprises:

a controller interface module capable of selecting between a manual override mode and a module selection mode wherein said module selection mode selected from a grade adjust laser mode, a grade adjust autograde mode, a grade adjust autodepth mode and a grade adjust slope mode;

wherein said grade adjust laser mode comprises a laser transmitter in a fixed location relative to said area wherein said laser transmitter transmits a laser beam over said area;

at least one laser sensor on said turf grading device wherein said laser sensor moves in concert with said left side or said right side;

a grade adjust laser mode controller capable of determining a location of said laser sensor relative to said laser beam and relaying a laser instruction to a laser control logic module wherein said laser control module actuates a transport cylinder to move said right side or said left side vertically;

wherein said grade adjust autograde mode comprises at least one radar proximity sensor wherein said radar proximity sensor moves in concert with said left side or said right side and detects a height above said area;

an autograde controller receives said height and relays a height signal to a proximity control logic module wherein said proximity control logic module actuates said transport cylinder to move said right side or said left side vertically;

wherein said grade adjust autodepth mode comprises at least one transport cylinder sensor wherein said transport cylinder sensor determines the extent of extension of said transport cylinder and relays said extension to a transport cylinder controller wherein said transport cylinder controller relays said extension to a cylinder control logic module which actuates said transport cylinder to move said right side or said left side vertically; and wherein said grade adjust slope mode comprises a slope sensor which determines an angle of said turf grading device relative to a lateral direction and relays said angle to a slope controller wherein said slope controller relays said slope to a slope control logic module wherein said slop control logic module actuates said transport cylinder to move said right side or said left side vertically to adjust said yaw of said turf grading device.

14. The non-transitional computer readable storage medium for processing controlling of a turf grading device of claim 13 wherein said grade adjusting laser mode comprises two laser sensors wherein one laser sensor of said laser sensors moves in concert with said left side and a second laser sensor of said laser sensors move in concert with said right side.

15. The non-transitional computer readable storage medium for processing controlling of a turf grading device of claim 13 further comprising a rotational encoder capable of rotating in concert with an axle pivot bearing of said turf grading device wherein said degree of rotation of said rotational encoder is correlates to said height.

16. The non-transitional computer readable storage medium for processing controlling of a turf grading device of claim 15 further comprising a display for indicating said height.

17. The non-transitional computer readable storage medium for processing controlling of a turf grading device of claim 13 comprising two radar proximity sensors wherein one radar proximity sensor of said radar proximity sensors moves in concert with said left and a second radar proximity sensor of said radar proximity sensors moves in concert with said right side.

18. The non-transitional computer readable storage medium for processing controlling of a turf grading device of claim 13 wherein said slope sensor further controls a pitch of said turf grading device.

* * * * *